(12) United States Patent
Matsumoto et al.

(10) Patent No.: US 10,192,502 B2
(45) Date of Patent: Jan. 29, 2019

(54) APPARATUS HAVING SPATIAL LIGHT MODULATOR AND CONVERTING UNIT CONVERTING INPUT VALUE TO CONTROL VALUE TO CONTROL SPATIAL LIGHT MODULATOR

(71) Applicant: HAMAMATSU PHOTONICS K.K., Hamamatsu-shi, Shizuoka (JP)

(72) Inventors: Naoya Matsumoto, Hamamatsu (JP); Takashi Inoue, Hamamatsu (JP); Norihiro Fukuchi, Hamamatsu (JP); Yuji Kobayashi, Hamamatsu (JP); Tsutomu Hara, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 14/885,718

(22) Filed: Oct. 16, 2015

(65) Prior Publication Data
US 2016/0063940 A1 Mar. 3, 2016

Related U.S. Application Data

(63) Continuation of application No. 14/264,692, filed on Apr. 29, 2014, now abandoned, which is a
(Continued)

(30) Foreign Application Priority Data

Jan. 19, 2007 (JP) ................................. 2007-10779
Jul. 24, 2007 (JP) ................................. 2007-192572

(51) Int. Cl.
*G09G 3/36* (2006.01)
*G01M 11/02* (2006.01)
(Continued)

(52) U.S. Cl.
CPC ....... *G09G 3/3648* (2013.01); *G01M 11/0257* (2013.01); *G01M 11/0271* (2013.01);
(Continued)

(58) Field of Classification Search
CPC .... G09G 3/3453; G09G 3/3446; G09G 3/346; G09G 3/3648; G09G 2300/0473;
(Continued)

(56) References Cited

U.S. PATENT DOCUMENTS 7,457,547 B2   11/2008  Frisken et al.
7,471,273 B2 * 12/2008  Hewlett ............... G09G 3/2037
                                                    345/108
(Continued)

FOREIGN PATENT DOCUMENTS

JP   H05-289043 A   11/1993
JP   2002-207202 A   7/2002
(Continued)

OTHER PUBLICATIONS

Jun. 6, 2013 Office Action issued in Japanese Patent Application No. 2012-166028.
(Continued)

*Primary Examiner* — Alexander Eisen
*Assistant Examiner* — Nelson Lam
(74) *Attorney, Agent, or Firm* — Oliff PLC

(57) ABSTRACT

In an apparatus for modulating light, an spatial light modulator includes a plurality of pixels and configured to modulate input light in response to a drive voltage for each of the pixels. An input value setting unit is configured to set an input value for the each of pixels. The input value is a digital value, an entire gray level of the digital value is "N", and "N" is a natural number. A converting unit is configured to convert the input value to a control value. A control value is a digital value, an entire gray level of the control value is
(Continued)

"M", and "M" is a natural number greater than "N". A driving unit is configured to convert the control value to a voltage value and drive the each of the pixels in response to the drive voltage corresponding to the voltage value.

8 Claims, 27 Drawing Sheets

Related U.S. Application Data continuation of application No. 11/889,181, filed on Aug. 9, 2007, now Pat. No. 8,749,463.

(51) Int. Cl.
*G09G 5/10* (2006.01)
*G02F 1/133* (2006.01)
*G02F 1/1362* (2006.01)
*G02F 1/21* (2006.01)

(52) U.S. Cl.
CPC ....... *G02F 1/13306* (2013.01); *G09G 3/3611* (2013.01); *G09G 5/10* (2013.01); *G02F 1/136277* (2013.01); *G02F 2001/136254* (2013.01); *G02F 2001/215* (2013.01); *G02F 2203/12* (2013.01); *G02F 2203/50* (2013.01); *G02F 2203/69* (2013.01); *G09G 2300/0491* (2013.01); *G09G 2300/08* (2013.01); *G09G 2320/02* (2013.01); *G09G 2320/0693* (2013.01)

(58) Field of Classification Search
CPC ....... G09G 2300/08; G09G 2300/0828; G09G 3/3433; G09G 3/344; G09G 3/3486; G09G 3/3493
USPC ............................. 345/87–104, 690–697, 84
See application file for complete search history.

(56) References Cited

U.S. PATENT DOCUMENTS

| | | | |
|---|---|---|---|
| 8,072,398 B2 | 12/2011 | Lee et al. | |
| 8,427,725 B2* | 4/2013 | Futterer | G02F 1/1335 345/100 |
| 8,525,772 B2* | 9/2013 | Tanaka | G09G 3/3666 345/100 |
| 8,576,206 B2* | 11/2013 | Matsumoto | G09G 3/2092 345/87 |
| 8,610,993 B2* | 12/2013 | Matsumoto | G02B 21/086 359/245 |
| 8,749,463 B2* | 6/2014 | Matsumoto | G09G 3/3611 345/87 |
| 9,007,286 B2* | 4/2015 | Matsumoto | G09G 3/2092 345/204 |
| 9,250,458 B2* | 2/2016 | Otsu | G09G 3/3611 |
| 9,250,459 B2* | 2/2016 | Otsu | G09G 3/3611 |
| 2001/0026283 A1 | 10/2001 | Yoshida et al. | |
| 2001/0033322 A1* | 10/2001 | Bommersbach | B41J 2/465 347/232 |
| 2003/0117711 A1* | 6/2003 | Kowarz | H04N 5/7416 359/618 |
| 2003/0160804 A1* | 8/2003 | Willis | G09G 3/2014 345/694 |
| 2004/0036707 A1* | 2/2004 | Willis | G09G 3/3611 345/691 |
| 2004/0041825 A1 | 3/2004 | Willis | |
| 2004/0125090 A1 | 7/2004 | Hudson | |
| 2004/0159636 A1 | 8/2004 | Sandstrom et al. | |
| 2004/0165170 A1 | 8/2004 | Sandstrom | |
| 2005/0063032 A1 | 3/2005 | Igasaki et al. | |
| 2005/0140597 A1 | 6/2005 | Lee et al. | |
| 2005/0162725 A1 | 7/2005 | Childers | |
| 2005/0219457 A1 | 10/2005 | Crossland et al. | |
| 2005/0225836 A1 | 10/2005 | Sandstrom | |
| 2006/0098156 A1 | 5/2006 | Frisken et al. | |
| 2006/0103910 A1 | 5/2006 | Huang et al. | |
| 2006/0115923 A1* | 6/2006 | Richards | B82Y 30/00 438/72 |
| 2006/0209056 A1 | 9/2006 | Willis et al. | |
| 2006/0221020 A1* | 10/2006 | Winer | G09G 3/2014 345/84 |
| 2007/0035803 A1 | 2/2007 | Holmes | |
| 2007/0268537 A1* | 11/2007 | Holmes | G02B 5/32 359/9 |
| 2007/0296663 A1 | 12/2007 | Goetz et al. | |
| 2008/0007576 A1 | 1/2008 | Ishii et al. | |
| 2009/0225071 A1 | 9/2009 | Arai et al. | |
| 2010/0026620 A1* | 2/2010 | Tanaka | G09G 3/3666 345/100 |
| 2010/0295836 A1* | 11/2010 | Matsumoto | G09G 3/2092 345/211 |
| 2014/0022474 A1* | 1/2014 | Otsu | G09G 3/3611 349/25 |
| 2014/0036182 A1* | 2/2014 | Matsumoto | G09G 3/2092 349/33 |
| 2014/0036206 A1* | 2/2014 | Otsu | G09G 3/3611 349/72 |
| 2015/0279293 A1* | 10/2015 | Missbach | G09G 3/3614 345/94 |
| 2016/0063940 A1 | 3/2016 | Matsumoto et al. | |

FOREIGN PATENT DOCUMENTS

| | | |
|---|---|---|
| JP | 2005-292662 A | 10/2005 |
| JP | 2006-072280 A | 3/2006 |
| JP | 2008-519298 A | 6/2008 |
| JP | 4947639 B2 | 3/2012 |
| WO | 2003/036368 A1 | 5/2003 |

OTHER PUBLICATIONS

Xun et al., "Phase calibration of spatially nonuniform spatial light modulators," Applied Optics, vol. 43, No. 35, Dec. 10, 2004, p. 6400-6406.
Harriman et al., "Improving spatial light modulator performance through phase compensation," SPIE Proceedings, vol. 5553, Oct. 2004.
Takeda et al., "Fourier-transform method of fringe-pattern analysis for computer-based topography and interferometry," Journal of the Optical Society of America, vol. 72, No. 1, Jan. 1982, p. 156-160.
Igasaki et al., "High Efficiency Electrically-Addressable Phase-Only Spatial Light Modulator," Optical Review, vol. 6, No. 4, 1999, p. 339-344.
Friedrichs et al., "One Megapixel SLM with high optical fill factor and low creep actuators," IEEE/LEOS International Conference on Optical MEMs and their Applications, 2006, p. 23-24.
Inoue et al., "Magnetophotonic crystals—a novel magneto-optic material with artificial periodic structures," Journal of Materials Chemistry, vol. 16, 2006, p. 678-684.
Conference Schedule Page for SPIE Optics Photonics Conference detailing a presentation by the present inventors and corresponding conference cover page.
Inoue et al., "Highly Stable Wavefront Control Using a Hybrid Liquid-Crystal Spatial Light Modulator," presented at the SPIE Optics Photonics Conference on Aug. 14, 2006 and copy of SPIE web site showing publication date of said presentation.
Inoue et al., "Highly stable wavefront control using a hybrid liquid-crystal spatial light modulator," Proceedings of SPIE, vol. 6306, Aug. 2006, p. 630603-1-630603-8.
Kacperski et al., "Active, LcoS based laser interferometer for microelements studies," Optics Express, vol. 14, No. 21, Oct. 16, 2006, p. 9664-9678.
Sep. 23, 2015 Office Action issued in U.S. Appl. No. 14/264,692.
Mar. 26, 2015 Office Action issued in U.S. Appl. No. 14/264,692.
Jun. 16, 2016 Office Action issued in U.S. Appl. No. 14/264,692.
Nov. 30, 2016 Office Action issued in U.S. Appl. No. 14/264,692.

(56) References Cited

OTHER PUBLICATIONS

Oct. 3, 2017 Office Action issued in U.S. Appl. No. 14/264,692.
Apr. 13, 2017 Office Action issued in U.S. Appl. No. 14/264,692.
Feb. 28, 2018 Advisory Action issued in U.S. Appl. No. 14/264,692.

* cited by examiner

| $t_a$ | $t_b$ | $\phi$ $\pi$ [rad] |
|---|---|---|
| 0 | 1030 | 1.5 |
| 1 | 1035 | 1.5078 |
| 2 | 1056 | 1.5156 |
| . | . | . |
| . | . | . |
| 127 | 1934 | 1.9922 |
| 128 | 1936 | 2.0000 |
| . | . | . |
| . | . | . |
| 254 | 3028 | 3.4844 |
| 255 | 3036 | 3.4922 |

| $t_a$ | $t_b$ | $\phi \pi [rad]$ |
|---|---|---|
| 0 | 1936 | 2.0000 |
| . | . | . |
| . | . | . |
| 126 | 3028 | 3.4844 |
| 127 | 3036 | 3.4922 |
| 128 | 1030 | 1.5 |
| 129 | 1035 | 1.5078 |
| 130 | 1056 | 1.5156 |
| . | . | . |
| . | . | . |
| 255 | 1934 | 1.9922 |

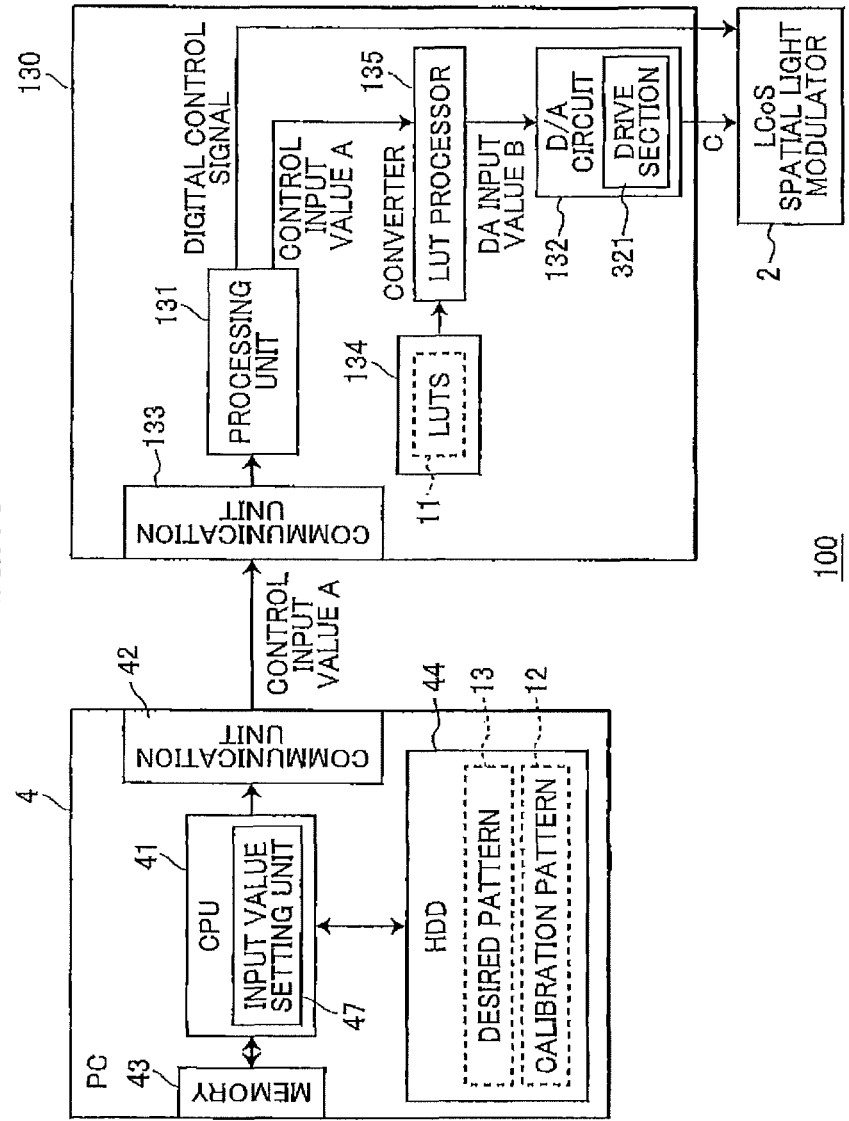

FIG.23

| B | B | A | D | C | C | B | B | B | B |
|---|---|---|---|---|---|---|---|---|---|
| B | A | D | C | C | B | A | A | B | B |
| B | A | D | C | C | B | A | A | B | A |
| B | B | A | D | D | C | B | A | B | A |
| B | B | B | A | D | D | C | B | B | A |
| B | B | B | B | A | D | D | C | B | B |
| A | A | A | A | A | D | C | B | C | C |
| D | D | D | D | D | C | B | B | C | D |
| C | C | C | D | C | B | B | C | D | A |
| B | C | C | D | C | B | C | D | A | B |

FIG.24

| | A | | D | | | F | | |
|---|---|---|---|---|---|---|---|---|
| | | | | | | | | |
| | | | | | | | | |
| | | | | | G | | | |
| | B | | E | | | | | |
| | | | | | | | | |
| | | | | | | | | |
| | | C | | | H | | | |
| | | | | | | | | |

51

| $t_a$ | $t_b$ | $\phi_{g-ave}$ $\pi$ [rad] |
|---|---|---|
| 0 | 1050 | 1.500 |
| 1 | 1055 | 1.508 |
| 2 | 1058 | 1.516 |
| . | . | . |
| . | . | . |
| 64 | 1472 | 2.000 |
| . | . | . |
| . | . | . |
| 191 | 2720 | 2.992 |
| 192 | 2713 | 3.000 |
| . | . | . |
| . | . | . |
| 254 | 3028 | 3.484 |
| 255 | 3036 | 3.492 |

FIG.32

| $t_a$ | $t_b$ | $\phi_{g-ave}\ \pi\ [rad]$ |
|---|---|---|
| 0 | 2713 | 3.000 |
| . | . | . |
| . | . | . |
| 62 | 3028 | 3.484 |
| 63 | 3036 | 3.492 |
| 64 | 1050 | 1.500 |
| 65 | 1055 | 1.508 |
| 66 | 1058 | 1.516 |
| . | . | . |
| . | . | . |
| 128 | 1472 | 2.000 |
| . | . | . |
| . | . | . |
| 255 | 2720 | 2.992 |

APPARATUS HAVING SPATIAL LIGHT MODULATOR AND CONVERTING UNIT CONVERTING INPUT VALUE TO CONTROL VALUE TO CONTROL SPATIAL LIGHT MODULATOR

This application is a continuation of U.S. application Ser. No. 14/264,692 filed Apr. 29, 2014, which is a continuation of U.S. application Ser. No. 11/889,181 filed Aug. 9, 2007, which claims priority to Japanese Patent Application No. 2007-10779 filed with the Japan Patent Office on Jan. 19, 2007 and Japanese Patent Application No. 2007-192572 filed with the Japan Patent Office on Jul. 24, 2007. The disclosure of the prior application is hereby incorporated by reference herein in its entirety.

BACKGROUND OF THE INVENTION

1. Field of the Invention

The present invention relates to a phase-modulating apparatus and a method for setting the phase-modulating apparatus.

2. Description of the Related Art

A spatial light modulator (SLM) using liquid crystal on silicon (LCoS) is well known in the art. When a voltage is applied to a pixel electrode, liquid crystal molecules in the LCoS rotate within a vertical plane of the substrate, modifying the phase modulation amount of incident light. However, since the phase modulation amount changes nonlinearly relative to voltage applied to the pixel electrode, it has not been possible to obtain a desired phase modulation amount.

SUMMARY OF THE INVENTION

FIG. 1 shows a conceivable LCoS spatial light modulator. Since LCoS silicon substrate 21 is formed in semiconductor processes, the silicon substrate 21 cannot be made thick and therefore have a low mechanical strength. Hence, as shown in FIG. 1, stress generated during processes for manufacturing LCoS elements can distort a silicon substrate 21 reducing the flatness of the LCoS mirror surface. Further, the thickness of a liquid crystal layer 27 is not uniform in the LCoS, and the phase modulation amount for each pixel differs according to the thickness of the liquid crystal layer 27. Hence, the wavefront of light reflected off the LCoS SLM is greatly distorted due to irregularities in the thickness of the liquid crystal layer 27 and distortion in the reflecting surface, resulting in different phase modulation amounts for each pixel. More specifically, the phase modulation amount $\Phi(V, x, y)$ is represented by the following equation, where a pixel position in the x and y direction is given by $(x, y)$ and V is voltage.

$$\Phi(V,x,y)=\phi(V,x,y)+\Phi_o(x,y) \quad (1)$$

Based on this equation, the phase modulation amount $\Phi(V, x, y)$ is obtained by adding $\phi(V, x, y)$ that depends on voltage to an amount $\Phi_0(x, y)$ that is independent on voltage. Here, $\phi(V, x, y)$ is expressed by the following equation.

$$\phi(V,x,y)=2\Delta n(V)d(x,y) \quad (2)$$

In the above equation, $\Delta n(V)$ is the birefringence index for the polarization component whose electric field that oscillates in a direction parallel to the liquid crystal orientation; and $d(x, y)$ is the thickness of the liquid crystal layer 27 at position $(x, y)$. Hence, $\phi(V, x, y)$ is dependent on the thickness $d(x, y)$ of the liquid crystal layer, and differs according to pixel. Further, the relationship between voltage V and $\phi(V, x, y)$ is nonlinear for each pixel. On the other hand, $\Phi_0(x, y)$ is primarily attributed to distortion in the LCoS reflecting surface (silicon substrate 21). Hereafter, the nonlinearity of the phase modulation amount in relation to the voltage and irregularities in phase modulation amount for each pixel caused by irregularities in $d(x, y)$ will be collectively referred to as the voltage-dependent phase modulation characteristics. In other words, the voltage-dependent phase modulation characteristics indicate the property of $\phi(V, x, y)$ in the phase modulation amount $\Phi(V, x, y)$. Further, irregularities in phase modulation amount for each position $(x, y)$ caused by distortion in the LCoS reflecting surface, which is indicated by $\Phi_0(x, y)$, will be referred to as voltage-independent distortion.

Various methods have been proposed for correcting phase modulation characteristics, such as "Phase Calibration of Spatially Nonuniform Spatial Light Modulator [Applied Opt., vol. 43, No. 35, December 2004] (hereinafter referred to as reference 1) or "Improving Spatial Light Modulator Performance through Phase Compensation" [Proc. SPIE, vol. 5553, October 2004] (hereinafter referred to as reference 2).

Further, in a method disclosed in International publication WO2003/036368, the voltage independent-distortion is calibrated by using a pattern for canceling distortion. The pattern is obtained by measuring wavefront distortion in a two-beam interferometer using the phase modulating SLM.

In the LCoS SLM of references 1 and 2, calibration is performed after measuring wavefront distortion using a two-beam interferometer. However, measurements taken with the two-beam interferometer combine voltage-dependent phase modulation characteristics with voltage-independent distortion. Further, the method in reference 1 does not perform correct calibration of nonlinearity, merely extracting regions from nonlinear characteristics that approach relative linearity.

Reference 2 uses a single look-up table to calibrate nonlinearity for all pixels. Hence, this method cannot correct irregularities in phase modulation amount among each pixel caused by voltage-dependent phase modulation characteristics. As a result, this method is less accurate when calibrating an LCoS SLM having severe distortion.

It is an object of the present invention to provide a phase-modulating apparatus capable of accurately calibrating voltage-dependent phase modulation characteristics and voltage-independent distortion and a method for setting the phase modulation apparatus.

In order to attain the above and other objects, the invention provides an apparatus for modulating light. The apparatus includes a spatial light modulator, an input value setting unit, a converting unit, a driving unit. The spatial light modulator includes a plurality of pixels and configured to modulate input light in response to a drive voltage for each of the pixels. The input value setting unit is configured to set an input value for the each of pixels. The input value is a digital value, an entire gray level of the digital value is "N", and "N" is a natural number. The converting unit is configured to convert the input value to a control value. The control value is a digital value, an entire gray level of the control value is "M", and "M" is a natural number greater than "N". The driving unit is configured to convert the control value to a voltage value and drive the each of the pixels in response to the drive voltage corresponding to the voltage value.

According to another aspects, the invention provides an method of modulating light. The method includes: by a spatial light modulator including a plurality of pixels, modulating input light in response to a drive voltage for each of the pixels; setting an input value for the each of pixels, wherein the input value is a digital value, an entire gray level of the digital value is "N", and "N" is a natural number; converting the input value to a control value, wherein the control value is a digital value, an entire gray level of the control value is "M", and "M" is a natural number greater than "N"; converting the control value to a voltage value; and driving the each of the pixels in response to the drive voltage corresponding to the voltage value.

BRIEF DESCRIPTION OF THE DRAWINGS

In the drawings:

FIG. 5 is an explanatory diagram showing a look-up table (LUT) according to the first embodiment;

FIG. 19 is a block diagram showing the structure of an LCoS phase modulator according to a second variation of the first embodiment;

FIG. 23 is an explanatory diagram showing one example of an LUT map;

FIG. 24 is an explanatory diagram showing another example of the LUT map;

FIG. 32 is an explanatory diagram of an LUT including calibration pattern data according to a eleventh variation of the second embodiment;

DESCRIPTION OF THE PREFERRED EMBODIMENTS

Next, preferred embodiments of the present invention will be described while referring to the accompanying drawings.

First Embodiment

Figure 2:
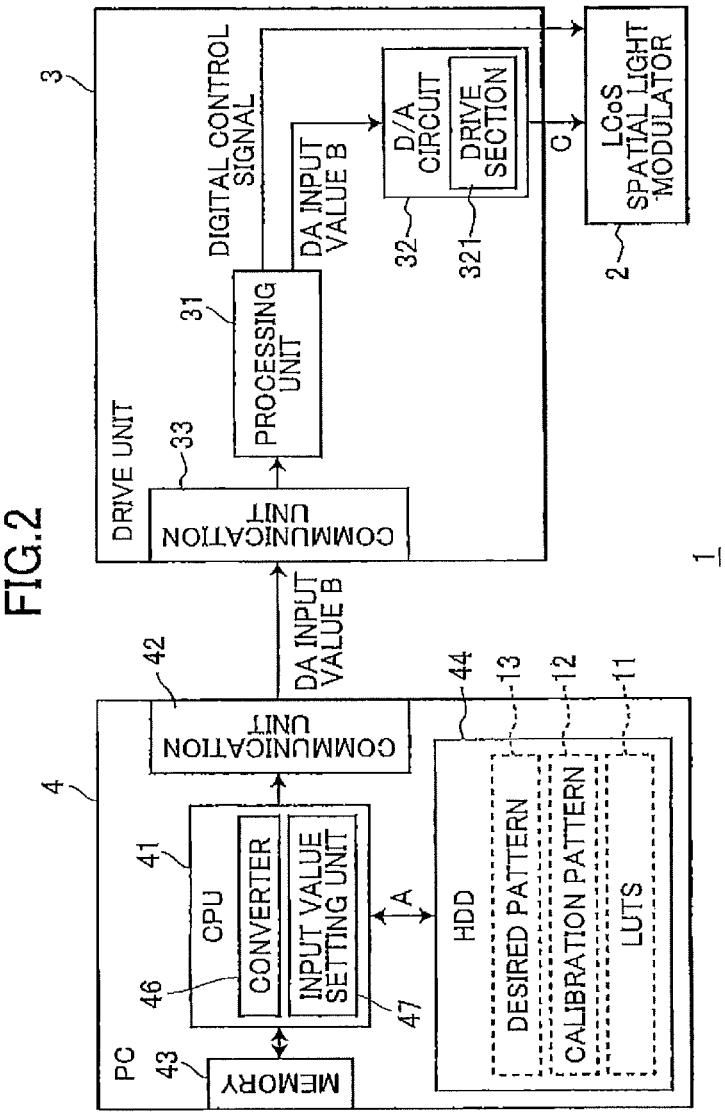
FIG. 2 is a block diagram showing the structure of an LCoS phase modulator according to a first embodiment of the present invention.

First, a first embodiment of the present invention will be described with reference to FIGS. 2 through 17(B). As shown in FIG. 2, an LCoS phase modulator 1 according to the first embodiment includes an LCoS spatial light modulator 2, a drive unit 3 for applying voltages to the LCoS spatial light modulator 2, and a control unit 4 for transmitting data, such as a control input value as described later, to the drive unit 3.

Figure 1:
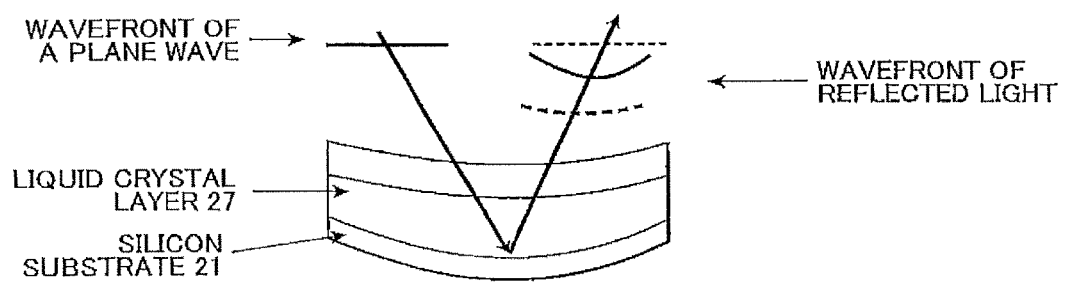
FIG. 1 is an explanatory diagram illustrating distortion in the LCoS reflecting surface of a conceivable phase-modulating apparatus.
Figure 3:
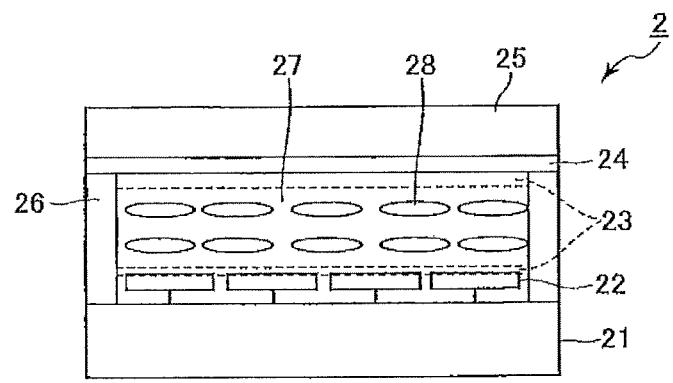
FIG. 3 is an explanatory diagram showing the structure of a LCoS spatial light modulator.

As shown in FIG. 3, the LCoS spatial light modulator 2 includes a silicon substrate 21, a spacer 26, and a glass substrate 25 bonded to the silicon substrate 21 via the spacer 26. The space formed between the silicon substrate 21 and glass substrate 25 is filled with a liquid crystal layer 27 having liquid crystal molecules 28. A plurality of pixel electrodes 22, and a circuit (not shown) for controlling the voltage applied to the pixel electrodes 22 are formed on the silicon substrate 21. An orientation layer 23 is formed over the pixel electrodes 22. The glass substrate 25 includes an opposing electrode 24 and another orientation layer 23. The electrode 24 opposes the pixel electrodes 22 through the liquid crystal layer 27. The liquid crystal molecules 28 in the liquid crystal layer 27 are formed to have a horizontal orientation, a vertical orientation, or a hybrid orientation. The pixel electrodes 22 in the LCoS spatial light modulator 2 are formed of aluminum and function as mirrors for reflecting incident light. Each pixel electrode 22 corresponds to one pixel when performing phase modulation.

In the present embodiment, it will be assumed that the LCoS spatial light modulator 2 has a total of T pixels, where T is a natural number. Each pixel has a unique voltage-dependent phase modulation characteristic and a unique voltage-independent phase modulation characteristic. Thus, the LCoS spatial light modulator 2 in the present embodiment satisfies equations (1) and (2). Assuming that a pixel position in the x and y direction is given by (x, y), $\Delta n(V)$ is the birefringence index for the polarization component whose electric field that oscillates in a direction parallel to the liquid crystal orientation, and d(x, y) is the thickness of the liquid crystal layer 27 at position (x, y). As will be described later with reference to FIG. 6, each pixel can operate within a voltage range P-S, but in the preferred embodiment is controlled to operate within a prescribed working voltage range Q-R set within the voltage range P-S.

The circuit for controlling the voltages applied to the pixel electrodes 22 is an active matrix circuit, for example. The active matrix circuit includes transistors and capacitors for each pixel electrode 22. Connected to the transistors are gate signal lines extending in the row direction (x direction) for selecting a pixel electrode 22, and data signal lines extending in the column direction (y direction) for supplying an analog voltage signal. Pixel electrodes 22 are selected by applying a Hi signal to the corresponding gate signal line, and the voltage of the corresponding pixel electrode is controlled by inputting an analog voltage signal in the capacitor of the selected pixel electrode 22 through the data signal line. By sequentially switching the selected data and gate signal lines, it is possible to input prescribed voltages for all pixel electrodes 22.

Figure 4A:
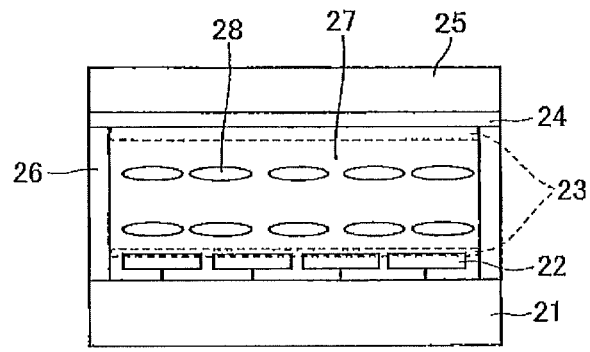
FIG. 4(A) is an explanatory diagram showing the state of liquid crystal molecules in the LCoS spatial light modulator when there's no potential difference between pixel electrodes and an opposing electrode.
Figure 4B:
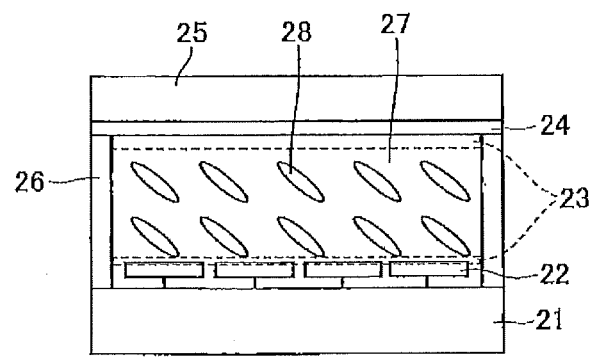
FIG. 4(B) is an explanatory diagram showing the state of liquid crystal molecules in the LCoS spatial light modulator when there's a relatively small potential difference between pixel electrodes and the opposing electrode.
Figure 4C:
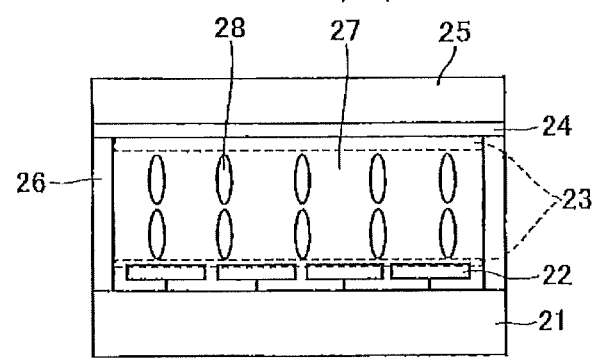
FIG. 4(C) is an explanatory diagram showing the state of liquid crystal molecules in the LCoS spatial light modulator when there's a relatively large potential difference between pixel electrodes and the opposing electrode.

As shown in FIGS. 4(A)-4(C), a desired voltage is applied to the pixel electrodes 22 to rotate the corresponding liquid crystal molecules 28. FIG. 4(A) shows the state of the liquid crystal molecules 28 when no potential difference exists between the pixel electrodes 22 and electrode 24. FIG. 4(B) shows the state of the liquid crystal molecules 28 when a relatively small potential difference exists, and FIG. 4(C) shows the state of the liquid crystal molecules 28 when a relatively large potential difference exists. When an applied voltage varies, the birefringence index in the polarization direction is changed. Thus, the phase of an incident light is modulated.

Linearly polarized light whose polarization plane is parallel to the orientation of the liquid crystal is irradiated from the glass substrate 25 side of the LCoS spatial light modulator 2 to modulate the phase of the light. Light incident on the glass substrate 25 side propagates through the liquid crystal layer 27 and is reflected by the pixel electrodes 22, the light again propagates through the liquid crystal layer 27 and is emitted from the glass substrate 25. The phase of the light is modulated while propagating through the liquid crystal layer 27. The light phase distribution can be controlled by modulating the phase of light for each pixel electrode 22. Hence, the LCoS spatial light modulator 2 can control the wavefront.

As shown in FIG. 2, the control unit 4 is a personal computer, for example, having a central processing unit (CPU) 41, a communication unit 42, a memory unit 43, and a hard disk drive (HDD) 44. The HDD 44 stores a desired pattern 13, look-up tables (LUTs) 11 (sets of reference data) for all T pixels, and a calibration pattern 12. The LUTs 11 have a one-on-one correspondence with each pixel in the LCoS spatial light modulator 2 and function to calibrate the voltage-dependent phase modulation characteristics for the corresponding pixels. The CPU 41 functions to control the entire control unit 4. The HDD 44 also stores a program for implementing the processing flowchart of FIG. 7 described later. The CPU 41 reads this program from the HDD 44 and executes the program, enabling the LCoS phase modulator 1 to perform the phase modulation process shown in FIG. 7.

The desired pattern 13 includes position data for each pixel and a value indicating a desired phase modulation amount to attain in each pixel (hereinafter referred to as pixel input value). The pixel input value is a digital signal having one of a total of N different input levels (from 0 to N−1). In the preferred embodiment, N=256. The N levels of pixel input values from 0 to N−1 represent phase modulation amounts for one period from 0 to $2\pi$.

The calibration pattern 12 functions to correct voltage-independent distortion. The calibration pattern 12 includes position data for each pixel and a value to be added to the pixel input value for each pixel (hereinafter referred to as pixel correction value). The pixel correction value is also a digital signal having one of N different levels (from 0 to N−1). The pixel correction values for the N levels from 0 to N−1 indicate phase correction amounts for one period from 0 to $2\pi$.

The CPU 41 includes a converter 46, and an input value setting unit 47. The input value setting unit 47 sets a control input value A for each pixel based on the pixel input value and the pixel correction value. The converter 46 converts the control input value A set for each pixel to a digital analog (DA) input value B while referencing the corresponding LUT 11.

When performing phase modulation with the LCoS phase modulator 1 described above, the CPU 41 reads the LUT 11, calibration pattern 12, and desired pattern 13 into the memory unit 43 from the HDD 44. The input value setting unit 47 adds the pixel input values in the desired pattern 13 to the pixel correction values in the calibration pattern 12 for each pixel and sets the control input values A to the sums. The control input values A are digital signals having one of N total levels (from 0 to N−1). In the preferred embodiment, N=256. If the resulting sum exceeds N, the input value setting unit 47 performs an additional process to fold back the phase of the control input values A and sets the control input values A to the result of this process. In other words, the control input values A are set to conform to the phase modulation amounts and to correspond to one period (2π [rad]) of phase modulation amounts from 0 to N−1. Hence, in the phase fold-back process the input value setting unit 47 replaces the value of control input values A that are negative or that exceed 255 from the addition process described above with the remainder obtained by dividing the values by 256. For example, if the sum is 512, the control input value A is set to 0. If the sum is 394, the control input value A is set to 128. In order to find the remainder of a negative value divided by 256, first the input value setting unit 47 may find the absolute value of the negative value and set the sum described above to the smallest positive value that can be added to the absolute value to produce an integer multiple of 256. For example, if the sum is −64, the control input value A is set to 192.

The converter 46 converts the control input values A to DA input values B for each pixel based on the corresponding LUT 11. The DA input value B is a digital signal having a total of M input levels (from 0 to M−1), where M is an integer satisfying the expression M>N. In the preferred embodiment, M=4096. The communication unit 42 outputs the DA input values B and other data to the drive unit 3.

The drive unit 3 includes a communication unit 33, a processing unit 31, and a digital analog (D/A) circuit 32. The communication unit 33 is for receiving data such as the DA input value from the control unit 4. The processing unit 31 generates a digital control signal including a vertical synchronization signal, a horizontal synchronization signal, and the like required for driving the LCoS spatial light modulator 2 based on the DA input values B. The processing unit 31 also outputs the DA input values B to the D/A circuit 32. The D/A circuit 32 includes the drive section 321 mentioned above. The drive section 321 converts, for each pixel, the DA input values B to voltage values within a prescribed working voltage range Q-R set within the operable voltage range P-S and drives each pixel with a drive voltage at the acquired voltage value.

Figure 6:
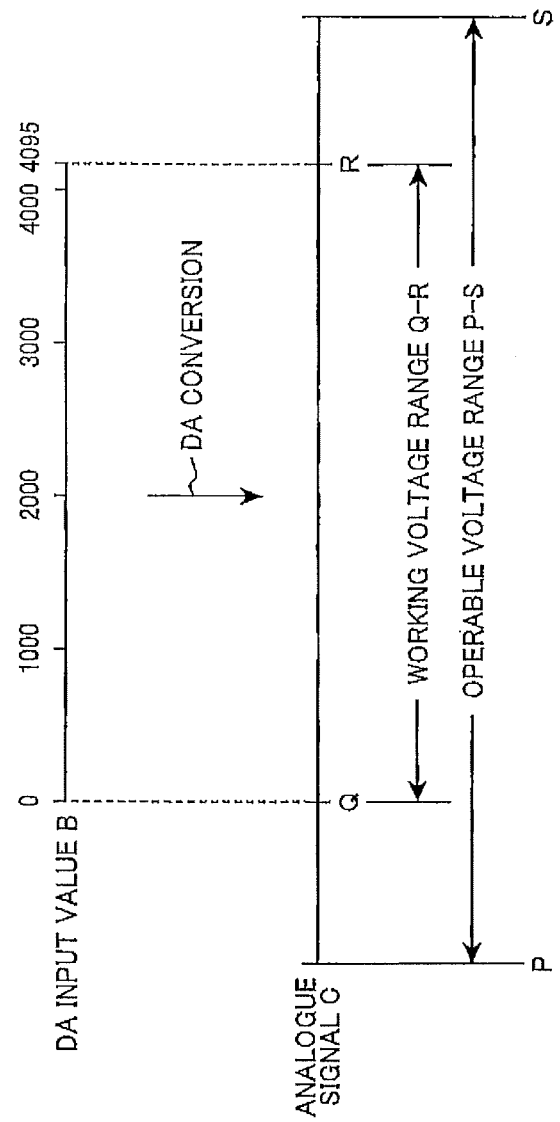
FIG. 6 is an explanatory diagram illustrating conversion with a D/A circuit.

First, the drive section 321 converts, for each pixel, the DA input values B to an analog signal C indicating the working voltage to be applied to the LCoS spatial light modulator 2. As shown in FIG. 6, the D/A circuit 32 is configured to convert a DA input value B between 0 and 4095 to an analog signal C indicating a drive voltage value within the working voltage range Q-R (from a minimum value Q to a maximum value R). Here, the DA input values B (0-4095) are assigned linearly to the working voltage range Q-R, and the working voltage range Q-R is a portion of the operating voltage range P-S within which the LCoS spatial light modulator 2 can operate. Each pixel modulates phase of light by a phase amount corresponding to the drive voltage applied thereto according to its own phase modulation characteristic.

The converter 46 converts, for each pixel, the control input value A to the DA input value B using the LUT 11 set for the each pixel. The drive section 321 further converts the DA input value B to the analog signal C indicating voltage value within the working voltage range Q-R, and applies the voltage to the LCoS spatial light modulator 2.

As shown in FIG. 5, the LUT 11 indicates correlations between values $t_a$ (first values) that can be selected as the control input value A and values $t_b$ (second values) that should be selected as the DA input value B. By using the LUT 11, the values $t_b$ to be selected as DA input values B are set so that the values $t_a$ that can be selected as the control input value A and the voltage-dependent phase modulation amount ϕ attained by the DA input value B have a linear relationship.

FIG. 5 also shows the relation between control input values ($t_a$) and measured phase modulation amounts ϕ attained by corresponding pixels when the drive section 321 converts the value $t_b$ selected for the DA input value B to a corresponding voltage value C and applies a voltage of this value to the pixels. However, LUT 11 does not have data corresponding the phase modulation amounts ϕ. As shown in FIG. 5, the values $t_a$ and the phase modulation amounts ϕ have a linear relationship. Moreover, the values $t_b$ selected for the DA input values B are set such that the phase modulation amounts ϕ corresponding to each $t_a$ selected for the control input values A are substantially equal in all LUTs 11. Specifically, the values $t_b$ for the DA input values B are set so that ϕ=1.5 for $t_a$=0, ϕ=1.5078 for $t_a$=1, etc.

Hence, if the control input values A are converted to DA input values B using the corresponding LUTs 11 for each pixel, and the DA input values B are further converted to analog signals C for applying a voltage, the phase modulation amount ϕ obtained for each pixel will be substantially linear relative to the control input values A. The LUT 11 may include data corresponding the phase modulation amount ϕ.

As shown in FIG. 5, the phase modulation amounts Φ obtained through this process are linear relative to the control input values A, with no variation between pixels.

Figure 7:
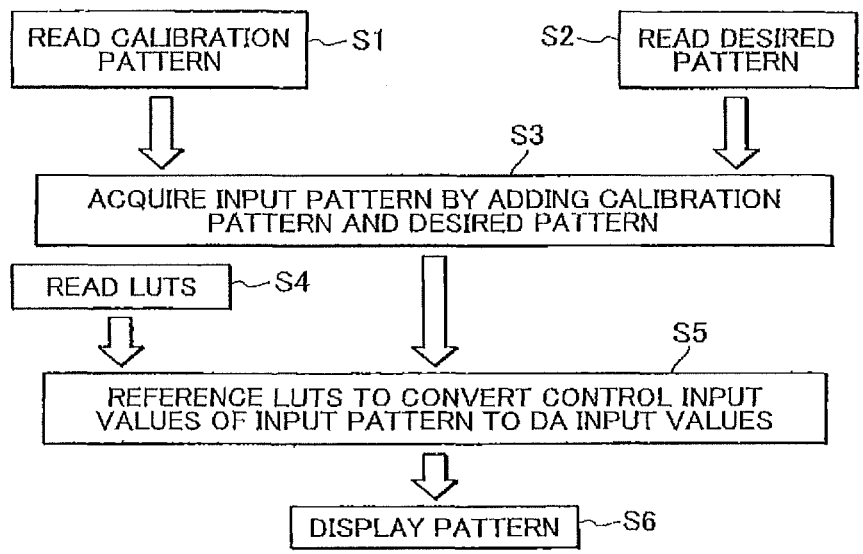
FIG. 7 is a flowchart illustrating steps in a method of phase modulation using the LCoS phase modulator according to the first embodiment.

The LCoS phase modulator 1 having the construction described above performs phase modulation according to the operation shown in FIG. 7. In step 1 (hereinafter step will be abbreviated as S) shown in FIG. 7, the CPU 41 of the control unit 4 reads the calibration pattern 12 into the memory unit 43 from the HDD 44. At the same time, the CPU 41 performs a parallel process in S2 to read the desired pattern 13 into the memory unit 43 from the HDD 44. However, the CPU 41 may also create the desired pattern 13 and save the desired pattern 13 in the memory unit 43 at this time. In S3 the input value setting unit 47 adds the pixel input values in the desired pattern 13 to the pixel correction values in the calibration pattern 12 for each pixel, folding back the phase for sums when necessary, to find the control input value A for each pixel. In S4 the CPU 41 reads the LUTs 11 corresponding to each pixel into the memory unit 43 from the HDD 44. In S5 the converter 46 finds the DA input value B for the control input value A of each pixel by referencing the corresponding LUT 11. In S6 the CPU 41 transmits the DA input values B to the communication unit 33 in the drive unit 3 via the communication unit 42. Subsequently, the processing unit 31 receives the DA input value B from the communication unit 33, and transfers the DA input values B to the D/A circuit 32, at which time the processing unit 31 produces digital control signals. The drive section 321 converts the DA input values B to analog signals C and outputs the analog signals C to the LCoS spatial light modulator 2. At the same time, the digital control signals are outputted from the processing unit 31 to the LcoS spatial light modulator 2. Accordingly, the LCoS spatial light modulator 2 modulates the phase of incident light.

When the LCoS phase modulator 1 is manufactured, the drive section 321, the LUTs 11, and the calibration pattern 12 are set to correspond to the LCoS spatial light modulator 2 provided in the LCoS phase modulator 1. The HDD 44 also stores the program for implementing the processing flowchart of FIG. 7. The order in which the settings are made is as follows. First, minimum and maximum voltages Q and R are set for the working voltage range Q-R of the D/A circuit 32. Next, an LUT 11 is set for each pixel, after which the calibration pattern 12 is created. Finally, the HDD 44 stores the program for implementing the processing flowchart of FIG. 7.

Figure 9:
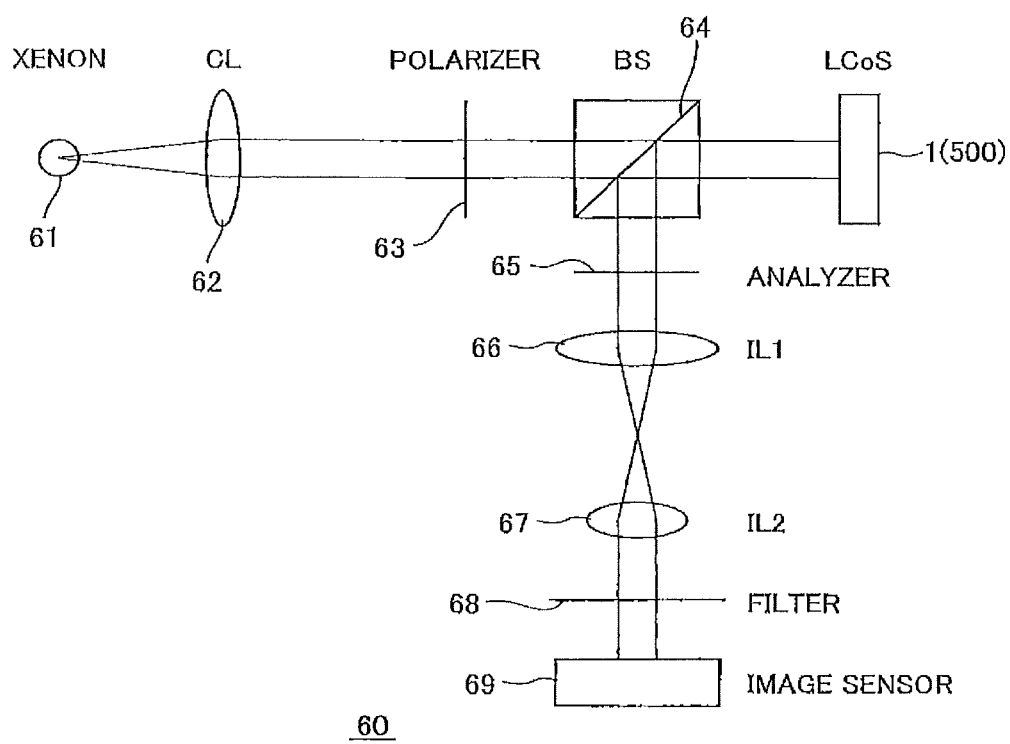
FIG. 9 is an explanatory diagram showing the structure of a polarization interferometer.
Figure 10:
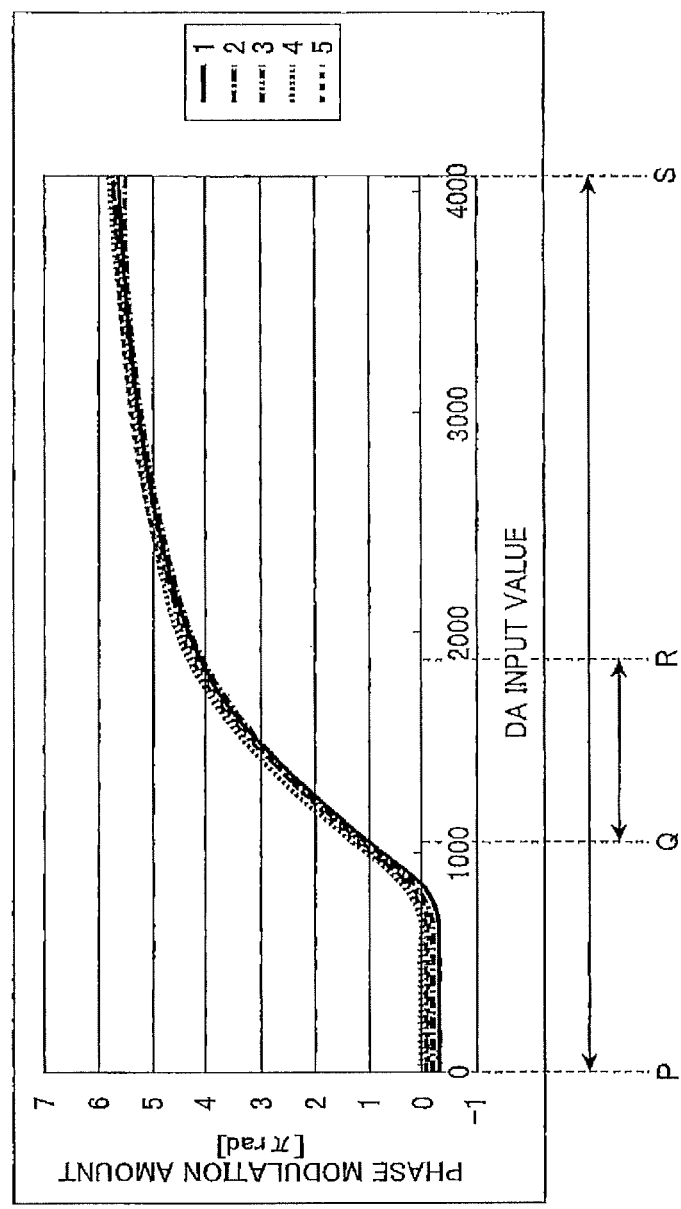
FIG. 10 is a graph showing the relationship of DA input values and the phase modulation amount.

The method of setting the minimum value Q and maximum value R for the working voltage will be described with reference to FIG. 8. First, in S11 of FIG. 8 a polarization interferometer 60 shown in FIG. 9 is used to measure voltage-dependent phase modulation characteristics (φ) for a plurality (five for example) of arbitrarily selected pixels. As shown in FIG. 9, the polarization interferometer 60 is configured of a Xenon lamp 61, a collimator lens 62, a polarizer 63, a beam splitter 64, the LCoS phase modulator 1, an analyzer 65, image lenses 66 and 67, a band pass filter 68, and an image sensor 69. In S11, the drive section 321 is initially set to assign DA input values B (0-4095) for the entire part of the operating voltage range P-S of voltages that can be applied to the LCoS spatial light modulator 2, as shown in FIG. 10. The drive section 321 of the D/A circuit 32 converts the same DA input value B to the analog signal C for all pixels and drives the LCoS spatial light modulator 2 with the same analog signals C, while the polarization interferometer 60 measures the phase modulation amounts. The measurements are repeated for each DA input value B from 0 to 4095. The image sensor 69 measures light that has been phase-modulated with the LCoS spatial light modulator 2. Since the polarizing direction of the polarizer 63 is shifted 45° from the orientation of liquid crystal molecules in the LCoS spatial light modulator 2, light incident on the LCoS spatial light modulator 2 (incident light) is shifted 45° to the orientation of the liquid crystal molecules 28. The incident light passes through the liquid crystal layer 27, producing a phase difference between the component in which the incident light is phase-modulated (component parallel to the orientation of the liquid crystal molecules 28) and the component not phase-modulated. Hence, the polarizing direction of light reflected by the LCoS spatial light modulator 2 (reflected light) is dependent on the phase modulation amount of the phase-modulated component in the incident light. Further, the orientation of the analyzer 65 is shifted 90° relative to the polarizer 63. The intensity of light passing through the analyzer 65 is dependent on the polarizing direction of the reflected light. Thus, the image sensor 69 measures voltage-dependent phase modulation characteristics as intensity data I. The phase modulation amount φ for a certain pixel can be found from the intensity data I measured by the image sensor 69 according to the following equation, for example.

$$\phi = 2\sin^{-1}(((I-I_{min})/(I_{max}-I_{min}))^{1/2})$$

Here, $I_{max}$ is the maximum value of intensity data measured while varying the voltage applied to the same pixel within the operating voltage range, and $I_{min}$ is the minimum value of such intensity data.

In S12 the CPU 41 finds the DA input value-voltage-dependent phase modulation characteristics for each pixel based on the results of measurements with the image sensor 69. FIG. 10 is a graph showing the relationship between the DA input values and voltage-dependent phase modulation amount obtained for five pixels. The graph in FIG. 10 confirms the following points (A)-(D). (A) The phase modulation amounts exceed 2π [rad]. (B) A region exists in which the phase modulation amount changes very little despite a change in voltage (the range of DA input values 0-800). The upper limit of this range will be referred to as a threshold voltage. (C) The phase modulation amounts differ among the five pixels. (D) The phase modulation amounts are nonlinear relative to the DA input values.

If the LcoS spatial light modulator 2 can achieve the phase modulation amounts in a range 0-2π [rad] or a range such that difference between a maximum value of the range and a minimum value of the range is 2π [rad], it is possible to obtain phase modulation amounts greater than 2π [rad] by performing the phase fold-back process. Hence, the range of drive voltages applied to the liquid crystal is sufficient, provided that a 2π [rad] range of phase modulation amounts can be ensured. However, when actually correcting distortion, it is necessary to have a certain degree of excess (margin) of the phase modulation amount to account for irregularities in the phase modulation amount for each pixel. Therefore, the range of drive voltages should be set to a value capable of achieving a phase modulation amount greater than 2π [rad]. In the preferred embodiment, this value is set to 3.5π [rad], that is, the range of drive voltages is set to achieve a phase modulation amount of 3.5π [rad]. Here, the phase fold-back process is similar to the process for folding back the phase of control input values. In other words, if the phase is greater than or equal to 2π [rad] or smaller than 0, the phase is replaced with a reminder value obtained by dividing the phase by 2π [rad].

Figure 11:
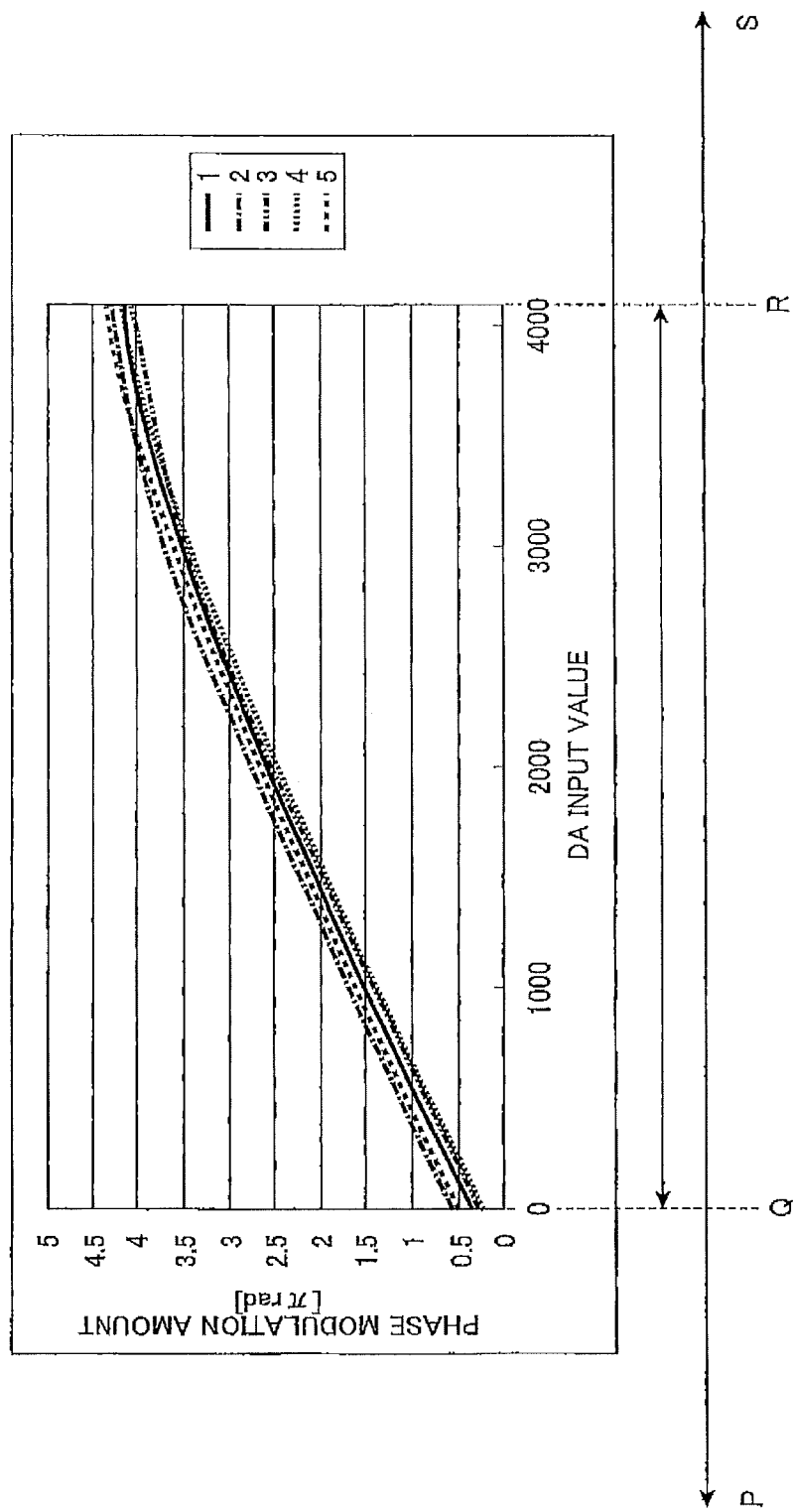
FIG. 11 is a graph showing the relationship between the DA input values and the phase modulation amount after setting minimum and maximum values for the voltage.

More specifically, in S13 the minimum value Q of the working voltage applied to the LCoS spatial light modulator 2 is set greater than or equal to the threshold voltage at which the liquid crystal starts to operate, the maximum value R is set less than or equal to a saturation voltage at which operation of the liquid crystal is saturated, and the phase modulation range between the minimum value Q and maximum value R of the working voltage is set to approximately 3.5π. In this way, the DA input values B are associated with 4096 levels for the region between the minimum value Q and maximum value R of the working voltage. FIG. 11 shows the relationship between the DA input values B, the phase modulation amount, and the working voltage range Q-R when the minimum value Q and maximum value R are set according to the above conditions. When using the entire operable voltage range of the LCoS spatial light modulator 2 in the example of FIG. 10, the DA input values have approximately 700 levels between about 1100 and 1800 for the range of phase modulation amounts from 0.5π to 4π [rad]. In the example of FIG. 11, the voltage can be controlled at 4096 levels for the same range of phase modulation amounts (0.5π-4π [rad]). In other words, the DA input values have about five times the number of levels for the same range of phase modulation amounts, thereby enabling the voltage to be controlled with great accuracy. Hence, by setting the minimum and maximum voltages Q and R, it is possible to convert the scale of the working voltage range for the DA input values. The drive section 321 is configured to convert the DA input values 0-4095 linearly to analog signals C, which specify voltage values in the working voltage range Q-R. The minimum and maximum voltages Q and R are set to the same values for all pixels.

Figure 12:
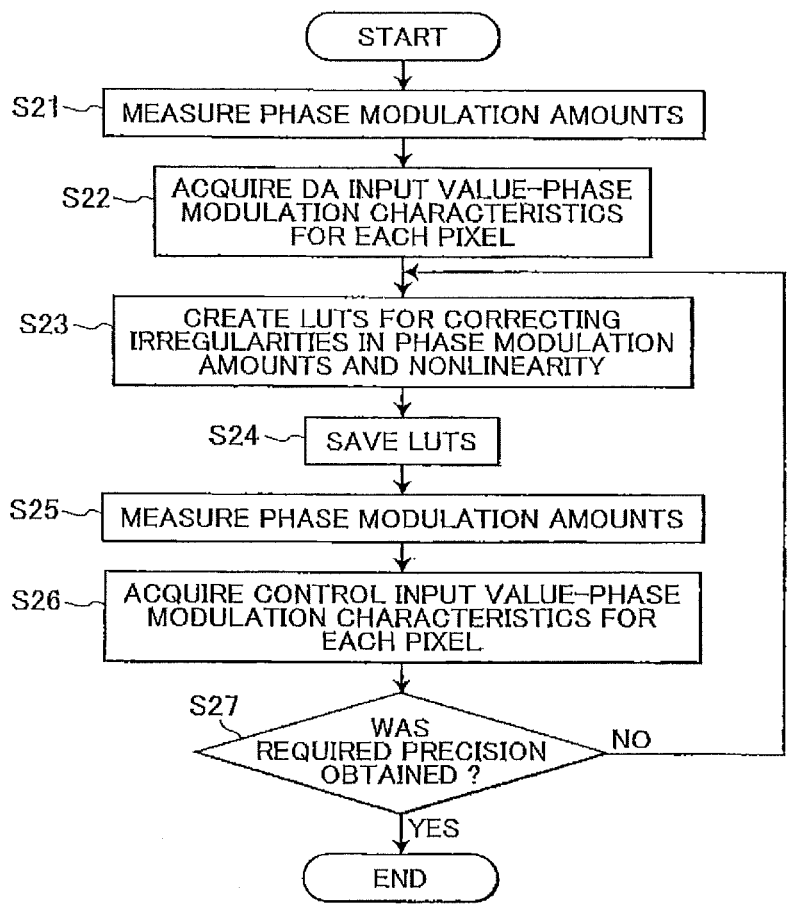
FIG. 12 is a flowchart illustrating steps in a method of creating the LUT.

Next, a method of creating the LUT 11 will be described with reference to FIG. 12. The creating LUT 11 process is performed after setting the working voltage Q-R. The LUT 11 is created for each pixel after completing the settings for the drive section 321. In S21, using the polarization interferometer 60 shown in FIG. 9, the relationship of the DA input values B and the voltage-dependent phase modulation amounts is obtained for each pixel in the LCoS spatial light modulator 2. Specifically, the polarization interferometer 60 measures the phase modulation amount for each pixel obtained when the same DA input value B is inputted for all pixels. Hence, the drive section 321 of the D/A circuit 32 converts the same DA input value B to the same analog signal C for all pixels and drives the LCoS spatial light modulator 2 with the analog signals C, while the polarization interferometer 60 measures the phase modulation amounts. The measurements are repeated for each DA input value B from 0 to 4095. In S22 the CPU 41 finds the DA input value-voltage-dependent phase modulation characteristics for each pixel based on the measured values found in S21. The results are similar to those in FIG. 11 described above, showing nonlinearity between the control input value and the phase modulation amount with irregularity among pixels.

In S23 the CPU 41 creates an LUT 11 for each pixel based on the DA input value-voltage-dependent phase modulation characteristics found above. Specifically, using the least-squares method or the like, the relationship between the DA input value and phase modulation amount is approximated with a polynomial expression using the phase modulation amount as a variable. This relationship is obtained for each pixel. This approximation can reduce the effects of measurement noise caused by the light source, image sensor, and the like. In S21 it is also possible to perform measurements for intervals of DA input values B rather than for all DA input values B and to estimate data for the DA input values B not used in measurements with this approximation. The approximation expresses the DA input value $t_b$ as a K-th polynomial of the phase modulation amount $\phi$ as in the following equation.

$$t_{b(1)} = f_1(\phi) = \sum_{k(1)=0}^{K} a_{k(1)} \phi^{k(1)} \tag{3}$$

In the above equation, the index (1) represents a value in the approximating polynomial found based on the first measurement. In this way, an approximation indicating the relationship between the DA input value and the phase modulation amount is found for each pixel. However, in order to represent 0.0-2.0π [rad] as 256 levels of control input values A and the relationship between the control input value A and the phase modulation amount is linear, the relationship of control input value A with the phase modulation amount $\phi$ is expressed by the following equation, where $t_{a(1)}$ indicates the control input value A.

$$\phi(t_{a(1)}) = (2\pi/256) \times t_{a(1)} + const \tag{4}$$

Here, $t_{a(1)}$ is an integer from 0 to 255, and const is an offset value. The offset value is set to the same value capable of realizing equation (4) for all pixels. The relationship between the control input value $t_{a(1)}$ and $t_b$ is found by substituting equation (4) into equation (3). Since $t_b$ is an integer, it is necessary to round off (or round out/down) to the nearest integer. Hence, the relationship between $t_{a(1)}$ and $t_b$ is expressed by the following equation, where ROUND represents the rounding off operation.

$$t_b = \text{ROUND}[f_1(\phi(t_{a(1)}))] \tag{5}$$

The LUT 11 is created by associating values of $t_{b(1)}$ found in equation (5) for values 0-255 of $t_{a(1)}$.

In S24 the CPU 41 saves the LUTs 11 created above in the HDD 44. The above LUTs 11 are obtained by calculating the phase from intensity output from the interferometer. While the minimum and maximum values of the measured interference intensity are used to create the LUT 11, there is potential for these values to contain errors. In S25-S27, the degree of error in these values is evaluated.

Specifically, in S25 the relationship between the control input values $t_a$ and the phase modulation amount $\phi$ is measured for all pixels, as described in S21. However, in S25 the converter 46 first converts the control input values A to DA input values B based on the LUTs 11 for each pixel just obtained in S24, after which the drive section 321 converts the DA input values B to analog signals C and drives the corresponding pixels in the LCoS spatial light modulator 2 based on the analog signals C. Through this process, the relationship between the control input values A ($t_a$) and the voltage-dependent phase modulation amount $\phi$ is measured for all pixels. In S26 the CPU 41 finds the control input value-phase modulation characteristics based on the results in S25. In S27 the CPU 41 determines from the results in S26 whether the LUTs 11 corrected the voltage-dependent phase modulation characteristics with the desired precision. For example, the CPU 41 may determine that the desired precision was obtained if the control input value-voltage-dependent phase modulation characteristics approach linearity, but the method of determination is not limited to this example. If the CPU 41 determines that the desired precision was not attained in S27, then the CPU 41 returns to S23 and updates the LUTs 11 based on the results in S26 to improve the precision for correcting the voltage-dependent phase modulation characteristics with the LUTs 11.

When executing S23 for the second time, the CPU 41 approximates the relationship between the control input values A ($t_a$) and the phase modulation amount $\phi$ according to the following equation, where M is a natural number greater than or equal to 2.

$$t_{a(M-1)} = f_M(\phi) = \sum_{k(M)=0}^{K} a_{k(M)} \phi^{k(M)} \tag{6}$$

Here, M represents a number of time to execute S23. When executing S23 for the second time (M=2), the equation (6) becomes as following expression.

$$t_{a(1)} = f_2(\phi) = \sum_{k(2)=0}^{K} a_{k(2)} \phi^{k(2)}$$

As in the case of the equation (4), the control input values must have a linear relationship with the phase modulation amount. Thus, following equation must be satisfied.

$$\phi(t_{a(M)}) = (2\pi/256) \times t_{a(M)} + const \tag{7}$$

Here, $t_{a(M)}$ represents a control input values that is expressed in 256 levels.

Based on equations (6) and (7), the relationship between the previous control input values A ($t_{a(1)}$) and the current control input values A ($t_{a(2)}$) can be expressed as follows.

$$t_{a(M-1)} = f_M(\phi(t_{a(M)})) \tag{8}$$

The relationship between $t_b$ and $t_{a(2)}$ is expressed as follows by substituting equation (8) into equation (5).

$$t_b = \text{ROUND}[f_1(\phi(f_2(\phi(t_{a(2)}))))] \tag{9}$$

Equation (9) is used to find the relationship between the new control input values A ($t_{a(2)}$) and the DA input value B ($t_b$). If the CPU 41 executes S23 J times (where J is a natural number such that J>2), the CPU 41 finds the following relationship for $t_b$ and $t_{a(J)}$.

$$t_b = \text{ROUND}[f_1(\phi(f_2(\ldots f_J(\phi(t_{a(J)})))))] \tag{10}$$

Here, the equations (6)-(8) are obtained for every time when returning to and executing S23. That is, the equations (6)-(8) are obtained for all M from 2 to J. Thus, the equation (10) is acquired from these equations (6)-(8) for all M from 2 to J.

In S23 the CPU 41 creates new LUTs 11 based on these values, and in S24 overwrites the LUTs 11 in the HDD 44 with the new LUTs 11. However, when the CPU 41 determines that the desired precision is obtained in S27 or when the CPU 41 determines that an improvement in precision is not obtained with the new LUTs 11 over the previous LUTs 11, the CPU 41 ends the LUT creating process.

The table in FIG. 5 shows the relationship between the $t_a$, $t_b$, and phase modulation amounts $\phi$ obtained in the above process for a certain pixel. A linear relationship of high precision is achieved between the control input values and the phase modulation amounts through conversion with the LUT 11.

Figure 13:
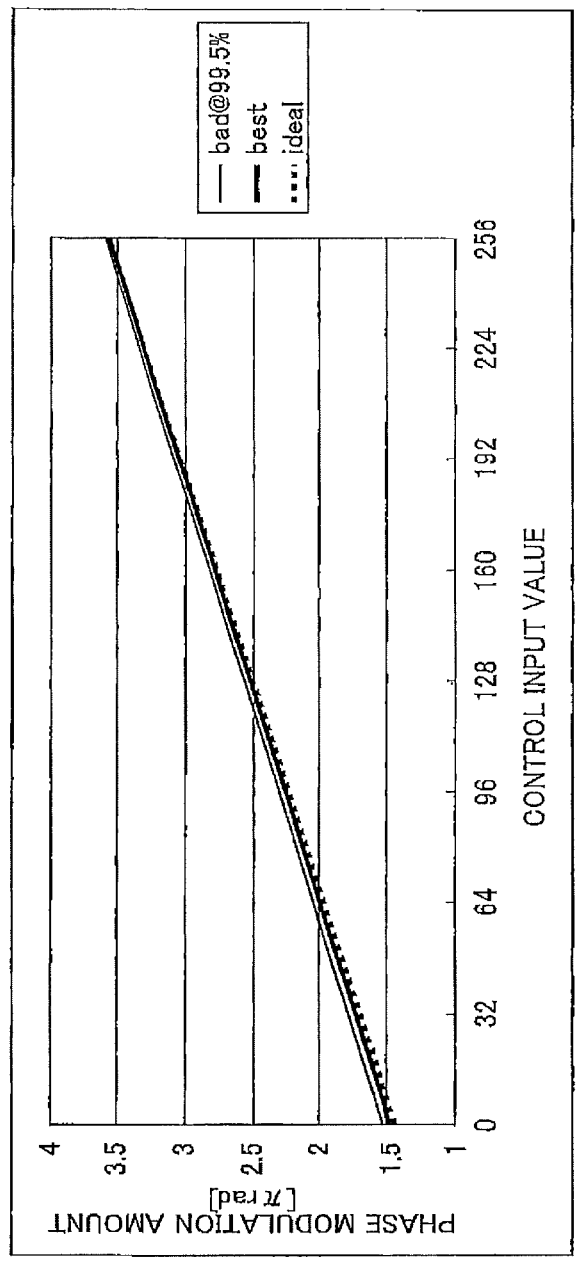
FIG. 13 is a graph showing the relationship between control input values obtained by calibrating the voltage-dependent phase modulation characteristics using the LUT, and the phase modulation amount.

The graph in FIG. 13 shows the relationship between the control input values A and the voltage-dependent phase modulation amounts for each pixel of the LCoS spatial light modulator 2 when phase modulation is performed using the corresponding LUTs 11. The dotted line indicates an ideal linear relationship between the control input values A and the phase modulation amounts. The bold line indicates the relationship between the control input values A and the phase modulation amounts for pixels having values closest to the dotted line, while the normal line indicates the relationship between the control input values A and the phase modulation amounts for pixels having values furthest from the dotted line. As can be seen, calibration performed using the LUTs 11 according to the preferred embodiment correct irregularities in phase modulation amounts among the pixels to achieve a linear relationship between the control input values A and the phase modulation amounts.

Figure 14:
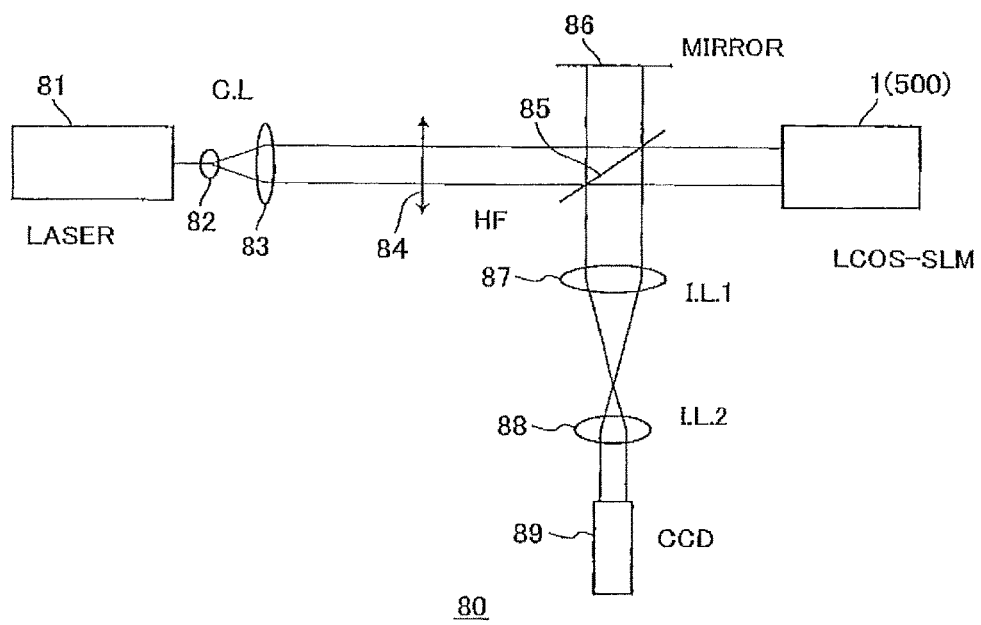
FIG. 14 is an explanatory diagram showing the structure of a Michelson interferometer.

After creating an LUT 11 for each pixel in the above process, the CPU 41 creates the calibration pattern 12. While voltage-independent distortion normally cannot be measured separately from the voltage-dependent phase modulation amount, this distortion can be measured by measuring the output wavefront of the LCoS phase modulator 1 when the voltage-dependent phase modulation characteristics have been corrected using the LUTs 11. The wavefront of light containing voltage-independent distortion is measured using a two-beam interferometer. In the preferred embodiment, a Michelson interferometer 80 shown in FIG. 14 is used as the two-beam interferometer. The Michelson interferometer 80 is configured of a laser light source 81, a spatial filter 82, a collimator lens 83, a polarizer 84, a beam splitter 85, the LCoS phase modulator 1, a mirror 86, image lenses 87 and 88, and a CCD 89. The polarizing direction of the polarizer 84 is parallel to the orientation of the liquid crystal. The Michelson interferometer 80 measures a fringe pattern produced by interference between a wavefront reflected off the mirror 86 and a wavefront reflected off the LCoS spatial light modulator 2 in the LCoS phase modulator 1. Using the method of fringe pattern analysis described in "Fourier-transform method of fringe pattern analysis for computer-based topography and interferometry", M. Takeda, H. Ina, and S. Kobayashi, J. Opt. Soc. Am., Vol. 72, 156-160 (1982), it is possible to find the output wavefront of the LCoS phase modulator 1 from the measured fringe pattern. That is, a voltage-independent distortion pattern is formed in the wavefront reflected by the LCoS spatial light modulator 2, and the wavefront reflected by the mirror 86 is a plane wave. Accordingly, the voltage-independent distortion can be obtained by taking the Fourier transform of the fringe pattern and removing the carrier component.

Figure 15:
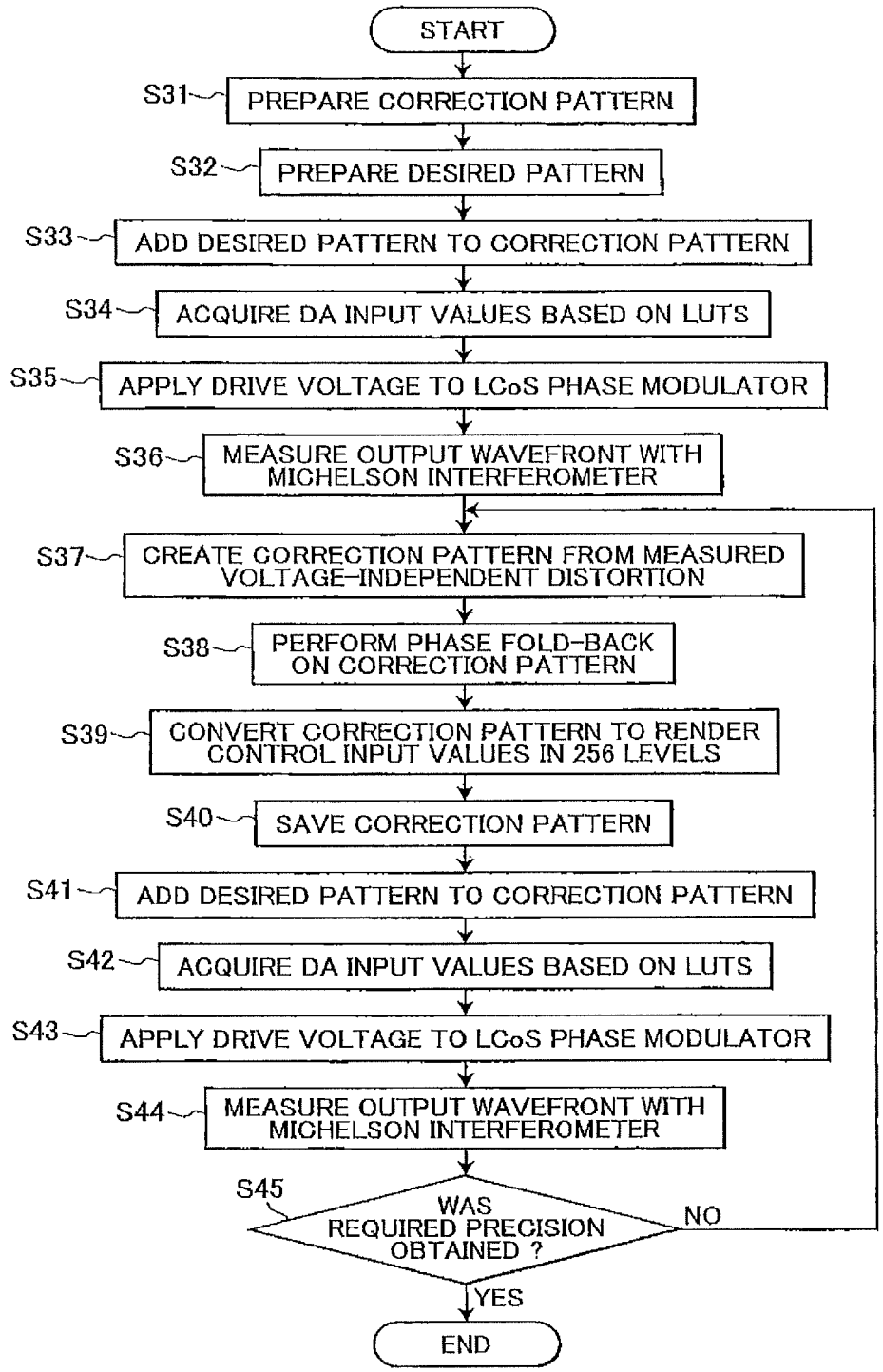
FIG. 15 is a flowchart illustrating steps in a method of forming a calibration pattern.
Figure 16:
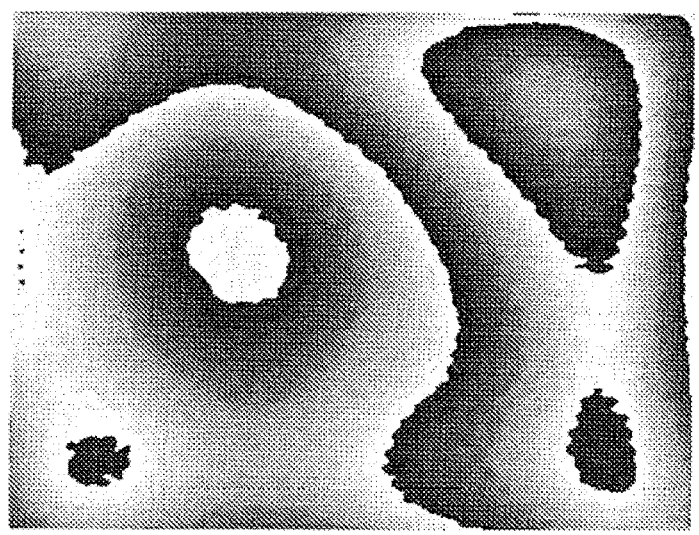
FIG. 16 is an explanatory diagram showing a calibration pattern created according to the method in FIG. 15.

Next, a method of creating the calibration pattern 12 for correcting voltage-independent distortion will be described with reference to FIG. 15. In S31 the CPU 41 initializes the calibration pattern 12 to a pattern in which the value of all pixels is 0. In S32 the CPU 41 sets the desired pattern 13 to a phase image in which the control input values A for all pixels are equivalent for any value from 0 to 255. In S33 the input value setting unit 47 adds the pixel input values in the desired pattern 13 to the pixel correction values in the calibration pattern 12 for each pixel and sets the control input values A to the results after performing the phase fold-back process. In S34 the converter 46 converts the control input values A to DA input values B based on the LUTs 11 corresponding to each pixel and transfers the DA input values B to the drive unit 3. In S35 the drive section 321 generates analog signals C based on the DA input values B in order to apply working voltages to the LCoS spatial light modulator 2. In S36 the CPU 41 measures the output wavefront of the LCoS phase modulator 1 based on results outputted from the CCD 89 of the Michelson interferometer 80. Since the voltage-dependent phase modulation characteristics have been corrected with the LUTs 11, the wavefront measured in S36 includes only voltage-independent distortion. In S37 the CPU 41 creates a pattern in which the signs of the measured voltage-independent distortion are reversed. In S38 the CPU 41 performs a phase fold-back process on phase values in the pattern acquired in S37. In S39 the CPU 41 references the LUTs 11 to represent the phase value of each pixel in the pattern as one of 256 levels after the pattern has undergone the phase fold-back process and converts the levels to control input values to obtain the calibration pattern 12. This conversion is achieved, for example, by using equation (4) or (7) that represents an ideal relation between the phase modulation amounts and the control input values. It may also possible to store the relation between the measured phase modulation amounts and the control input values in the LUTs 11 as shown in FIG. 5 and to achieve the conversion by using these LUTs 11. FIG. 16 shows an example in which the calibration pattern 12 is rendered as an image in 256 levels. In S40 the CPU 41 saves the calibration pattern 12 in the HDD 44.

As when creating the LUTs 11, measures of interference may contain errors in the process described above. The degree of these errors is analyzed in S41-S45. Specifically, as in S33 described above, in S41 the input value setting unit 47 adds the pixel input values in the desired pattern 13 described above to the pixel correction values in the calibration pattern 12 just obtained in S40, setting the results as the control input values A and performing phase fold-back on the control input values A when necessary. Steps S42-S44 are identical to S34-S36. In S42 the converter 46 finds DA input values B corresponding to the control input values A obtained in S41. In S43 the drive section 321 converts the DA input values B to analog signals C for applying drive voltage to the LCoS spatial light modulator 2. In S44 the CPU 41 measures the output wavefront based on the results outputted from the CCD 89. In S45 the CPU 41 determines based on the results of these measurements whether the calibration pattern 12 just obtained in S40 is able to perform correction at the required precision. For example, the CPU 41 may determine that the desired precision is obtained if the wavefront has a desired flatness, but the determination method is not limited to this example. The CPU 41 ends the calibration pattern creating process upon determining in S45 that the calibration pattern 12 obtained the required precision or an improvement in precision is not obtained over the previous calibration pattern 12. If the required precision was not obtained, the CPU 41 returns to S37 and recreates the calibration pattern 12 based on the voltage-independent distortion indicated in the results from S44. Specifically, in S40 the CPU 41 adds the pixel correction values from the calibration pattern 12 obtained previously to the pixel correction values from the calibration pattern 12 just obtained for each pixel and saves the sums in the HDD 44. In other words, to obtain a new calibration pattern 12, the CPU 41 adds the pixel correction values for the calibration pattern 12 currently obtained in S39 and the pixel correction values for the calibration pattern 12 previously obtained in S39 for each pixel. In this way, the CPU 41 repeatedly updates the calibration pattern 12.

Figure 17A:
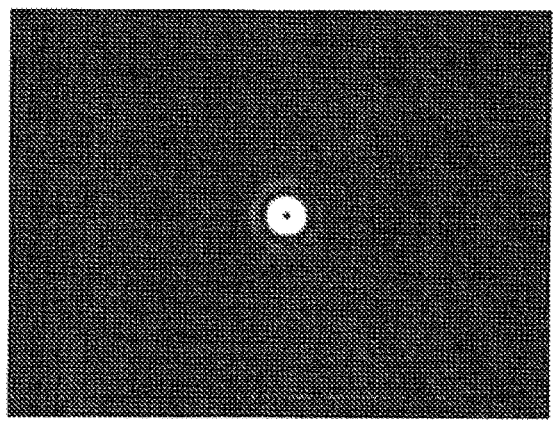
FIG. 17(A) is an explanatory diagram showing the results of performing phase modulation by applying the LUT and the calibration pattern.
Figure 17B:
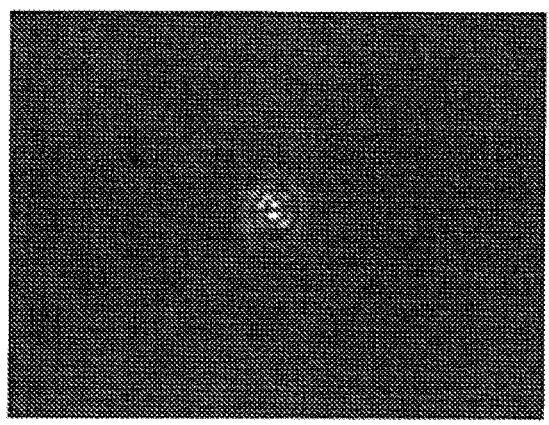
FIG. 17(B) is an explanatory diagram showing the results of performing phase modulation without using the LUT and the calibration pattern.

The LCoS phase modulator 1 according to the preferred embodiment described above controls the LCoS spatial light modulator 2 for DA input values B expressed in 4,096 levels within the working voltage range smaller than the operable voltage range that ensures the required range of the phase modulation amounts. Hence, the LCoS phase modulator 1 can control the voltages applied to the LCoS spatial light modulator 2 with great accuracy. Moreover, the LCoS phase modulator 1 employs the LUTs 11 to achieve a substantially linear relationship between the control input values A and the voltage-dependent phase modulation amounts and corrects irregularities among pixels caused by voltage dependence, thereby obtaining the desired phase modulation amounts with great accuracy. Further, the LCoS phase modulator 1 uses the calibration pattern 12 to correct voltage-independent distortion to achieve more accurate phase modulation. FIG. 17(A) shows measurements of phase modulation for a Laguerre-Gaussian beam using the LUTs 11 and the calibration pattern 12. FIG. 17(B) shows the same beam when corrections are not performed. As expected, a pattern of concentric circles can be seen in FIG. 17(A).

Further, when creating the LUTs 11 and when creating the calibration pattern 12, the process is repeated until either the required precision is obtained or until an improvement in precision is not obtained. Thus, it is possible to obtain highly accurate LUTs 11 and a highly accurate calibration pattern 12 capable of accurately correcting voltage-dependent phase modulation characteristics and voltage-independent distortion.

First Variation of the First Embodiment

Figures 18, 21:
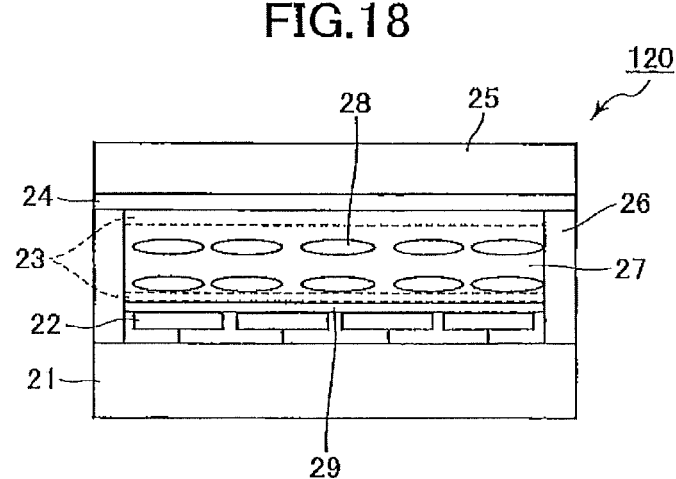
FIG. 18 is an explanatory diagram showing the structure of an LCoS spatial light modulator according to a first variation of the first embodiment.
FIG. 21 is an explanatory diagram of an LUT including calibration pattern data according to a seventh variation of the first embodiment.

While the pixel electrodes 22 also function as mirrors in the LCoS spatial light modulator 2 described above, a device such as a LCoS spatial light modulator 120 shown in FIG. 18 having a dielectric mirror 29 layered over the pixel electrodes 22 may be used in place of the LCoS spatial light modulator 2. Here, parts and components of the LCoS spatial light modulator 120 similar to those in the LCoS spatial light modulator 2 have been designated with the same reference numerals to avoid duplicating description.

Second Variation of the First Embodiment

While the LUTs 11 and the calibration pattern 12 are stored in the HDD 44 on the control unit 4 in the LCoS phase modulator 1 according to the first embodiment, the LUTs 11 may be saved in a drive unit 130 instead of the HDD 44, as in an LCoS phase modulator 100 shown in FIG. 19. Specifically, the control unit 4 does not store the LUTs 11 in the HDD 44. Further, the CPU 41 is not provided with the converter 46, rather the drive unit 130 has an LUT processor 135 that functions as a converter. More specifically, the drive unit 130 includes a processing unit 131, a D/A circuit 132, a communication unit 133, a RAM 134 for saving the LUTs 11, and the LUT processor 135. The LUTs 11 are saved in ROM (not shown) in the drive unit 130 and read into the RAM 134 when the LCoS phase modulator 100 is started. The structure of the LCoS spatial light modulator 2 is identical to that in the LCoS phase modulator 1 of the first embodiment. Further, the structures of the communication unit 133 and D/A circuit 132 are identical to the communication unit 33 and digital analog (D/A) circuit 32 shown in FIG. 2.

For phase modulation, the input value setting unit 47 sets the control input values A for each pixel by adding the desired pattern 13 and calibration pattern 12 and transmits the control input values A to the drive unit 130. The control input values A are transferred to the LUT processor 135 via the communication unit 133 and processing unit 131. The LUT processor 135 converts the control input values A to DA input values B based on the LUTs 11 in the RAM 134. The LUT processor 135 transfers the DA input values B to the D/A circuit 132, which converts the DA input values B to analog signals C indicating operating voltage values for driving the LCoS spatial light modulator 2.

Third Variation of the First Embodiment

Figure 20:
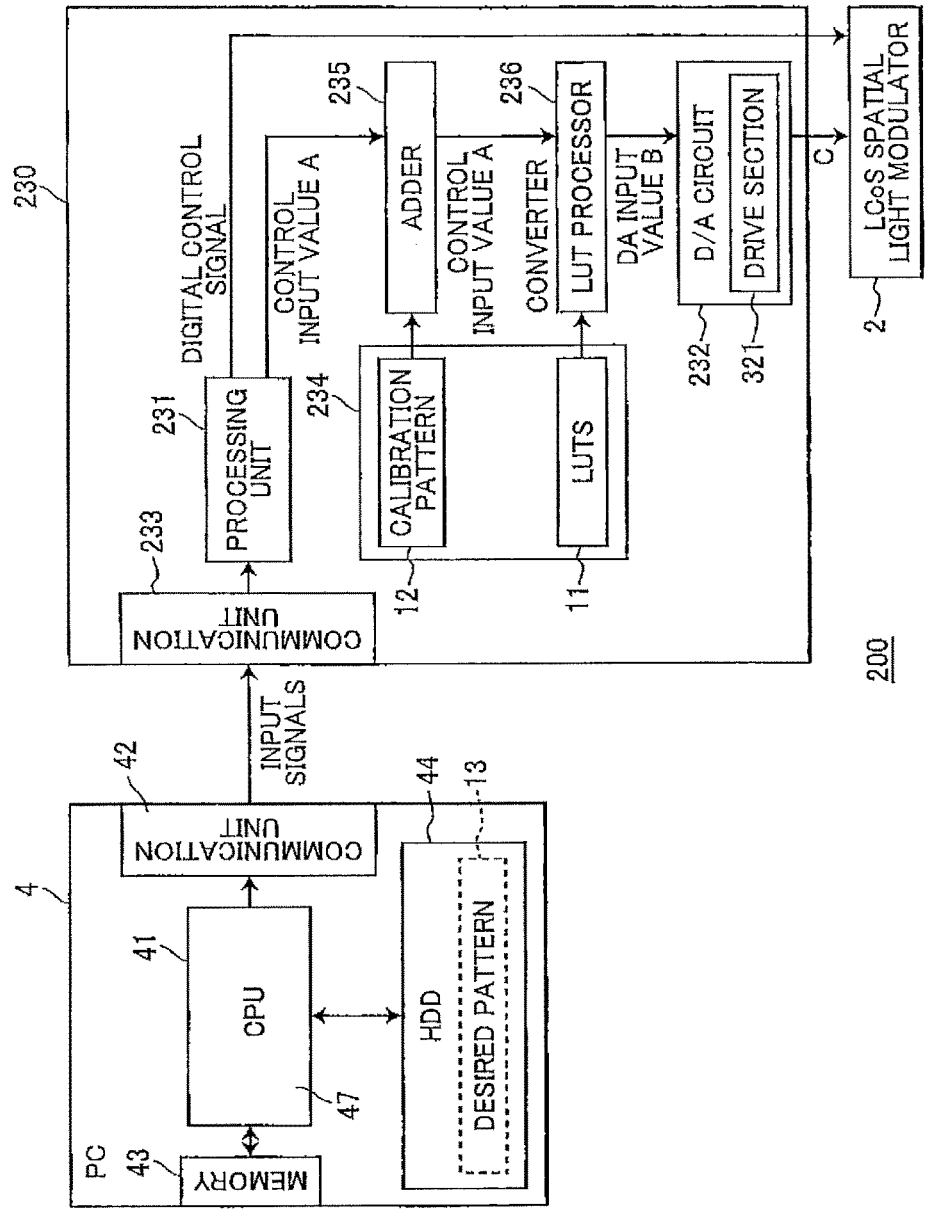
FIG. 20 is a block diagram showing the structure of an LCoS phase modulator according to a third variation of the first embodiment.

The drive unit 3 may also be replaced with a drive unit 230 that holds the LUTs 11 and calibration pattern 12, as in an LCoS phase modulator 200 shown in FIG. 20. In this example, the CPU 41 is provided with neither the converter 46 nor the input value setting unit 47. Instead the drive unit 230 has an adder 235 function as the input setting unit 47 and an LUT processor 236 that functions as a converter. Further, the calibration pattern 12 and LUTs 11 are not stored in the HDD 44. More specifically, the drive unit 230 has a processing unit 231, a D/A circuit 232, a communication unit 233, a RAM 234 for holding the LUTs 11 and the calibration pattern 12, an adder 235, and the LUT processor 236. The LUTs 11 and the calibration pattern 12 are saved in ROM (not shown) on the drive unit 230 and are read into the RAM 234 when the LCoS phase modulator 200 is started. The structures of the communication unit 233 and D/A circuit 232 are identical to the communication unit 33 and D/A circuit 32 in FIG. 2. When the control unit 4 transmits pixel input values indicating a desired pattern to the drive unit 230, the adder 235 adds the calibration pattern 12 in the RAM 234 to the pixel input values to produce the control input values A and transmits the control input values A to the LUT processor 236. The LUT processor 236 converts the control input values A to DA input values B by referencing the LUTs 11 and transmits the DA input values B to the D/A circuit 232. In the D/A circuit 232, the drive section 321 converts the DA input values B to analog signals C indicating the operating voltages and outputs the analog signals C to the LCoS spatial light modulator 2.

The functions of the control unit 4 may also be incorporated in the drive unit 230. In this case the RAM 234 also stores the desired pattern 13. Both the desired pattern 13 and the calibration pattern 12 are saved in ROM (not shown) in the drive unit 230 and read into the RAM 234 when the LCoS phase modulator 200 is started.

Fourth Variation of the First Embodiment

While the drive unit 3 shown in FIG. 2 is provided with only one D/A circuit 32, the drive unit 3 may be given a plurality of D/A circuits 32 for simultaneously outputting a plurality of analog signals to the LCoS spatial light modulator 2 in order to simultaneously write analog signals to a plurality of pixels. In the drive unit 3 having this construction, the process circuit of the drive unit 3 is configured to simultaneously output DA input values B for a plurality of pixels to the D/A circuits 32.

Fifth Variation of the First Embodiment

While an LUT 11 is created for each pixel in the first embodiment described above, it is possible to form blocks, each of which includes a plurality of neighboring pixels, and to create one LUT 11 for each block. For example, a single block may be configured of 2×2 pixels or 4×4 pixels, with one LUT 11 created for each block. Here, the voltage-dependent phase modulation characteristics for at least one pixel in a block are measured, and the LUT 11 is created for the block based on the average of measured values for the at least one pixel in the block. However, when the voltage-dependent phase modulation amount is measured for only one pixel in the block, the LUT 11 may be created based simply on the measured value of the pixel rather than an average value. This configuration can reduce the amount of data stored for the LUTs 11, since it is not necessary to prepare an LUT 11 for each pixel.

It is also possible to vary the number of pixels constituting a block. In this case, an LUT 11 is created for each block based on the control input value-voltage-dependent phase modulation characteristics for the corresponding block. Since the phase modulation amount varies according to the thickness of the liquid crystal layer, the number of pixels constituting a block may be reduced in areas where the liquid crystal layer thickness changes greatly (for example, setting a block equivalent to one pixel) and increased in areas where changes in liquid crystal layer thickness are slight (for example, setting a block equivalent to 8×8 pixels). With this configuration, correction can be performed accurately and efficiently, while reducing the amount of data saved for the LUTs 11.

Sixth Variation of the First Embodiment

The calibration pattern 12 may also be configured to hold values for units of blocks. In this case, the phase modulation characteristics are measured for at least one pixel in a block, and the correction value for each pixel in the block is set to the average value of correction values for each pixel that were found in the block. However, when the phase modulation characteristics are measured for only one pixel in a block, the correction value for the block may be simply set to the correction value for that pixel rather than an average value.

Seventh Variation of the First Embodiment

Further, as shown in FIG. 21, the values of the calibration pattern 12 may be included in the LUTs 11. Here, for a given pixel, t represents the pixel input value of the desired pattern 13 and p represents the pixel correction value of the calibration pattern 12. In the preferred embodiment, after setting the control input value A by adding the pixel input value t to the pixel correction value p, the control input value A is converted to the DA input value by applying the LUT 11. That is, when referencing the LUT 11, the value t+p is the reference position of the control input value A. The desired image is changed as needed, that is, the pixel input value t varies depending on the desired pattern 13. However, the pixel correction value p is a fixed value. Hence, the reference position is always shifted from the input value t by the value p. This is equivalent to shifting the reference start position in the LUT by the value p.

Hence, data for correcting voltage-independent distortion can be included in the LUT 11 by shifting the reference position in the LUT 11 for each pixel by the value in the calibration pattern for the same pixel. FIG. 21 has included data for correcting voltage-independent distortion as well as the data of FIG. 5, with p=128. For example, the value of $t_b$ is 1,030 when $t_a$ is 0 in the table of FIG. 5, but this value of $t_b$ appears when $t_a$ is 128 in FIG. 21.

Here, additional examples will be described for the cases when p=1 and p=−1. In the LUT 11 shown in FIG. 5, the DA input values $t_b$ corresponding to control input values $t_a$ 255, 0, and 1 are 3,036, 1,030, and 1,035, respectively. When p=1, it is possible to create an LUT 11 that associates DA input values $t_b$ of 1,030, 1,035, and 1,056 with the same control input values $t_a$ of 255, 0, and 1. Alternatively, when p=−1, it is possible to create an LUT 11 that associates DA input values $t_b$ of 3,028, 3,036, and 1,030 with the same control input values $t_a$.

In this case, steps S1 and S3 are not required in the phase modulation method described with reference to FIG. 7. In S1 of FIG. 7, the CPU 41 reads the desired pattern 13, and the input value setting unit 47 sets the value of each pixel in the desired pattern 13 as an control input value A. In S4 the CPU 41 reads the LUT 11 in FIG. 21 for each pixel. In S5 the converter 46 converts the control input values A to DA input values B by referencing the LUTs 11 in FIG. 21 for each pixel. Hence, the control unit 4 can also correct voltage-independent distortion simply by applying the LUTs 11 that include the calibration pattern, thereby eliminating the need to save the calibration pattern and to perform a process to add the calibration pattern to the desired image.

The LUTs 11 including the calibration pattern can also be created by units of blocks. In this case, the LUTs 11 and the calibration pattern 12 are divided into blocks according to the same method described above. More specifically, the size and position of the blocks in the LUTs 11 and the calibration pattern 12 are identical to each other. The value for each block in the calibration pattern 12 is simply reflected in the corresponding block constituting the LUTs 11.

In this way, data in the calibration pattern 12 can be included in the LUTs 11 for correcting voltage-independent distortion while the LUTs 11 are used to convert control input values A to DA input values B. Therefore, the process of adding the calibration pattern 12 may be omitted, achieving more efficient phase modulation.

Eighth Variation of the First Embodiment

While the D/A circuit 32 is provided in the drive unit 3 in the first embodiment described above, the D/A circuit may be separated from the drive unit 3, and the LCoS spatial light modulator 2 may be provided with the D/A circuit and a new reception circuit for receiving the DA input values B. With this construction, the drive unit 3 transfers the DA input values B to the reception circuit on the LCoS side.

Ninth Variation of the First Embodiment

The D/A circuit 32 may also be replaced with a pulse modulation circuit. With this construction, the pulse modulation circuit outputs a digital pulse modulation signal for driving the LCoS spatial modulator.

Tenth Variation of the First Embodiment

In the first embodiment described above, the voltage-dependent phase modulation characteristics are measured for five pixels, and the minimum and maximum voltages Q and R are set based on the measurement results. However, provided that at least one pixel is measured, the number of measured pixels is arbitrary, and the minimum and maximum voltages are set based on the voltage-dependent phase modulation characteristics of the measured at least one pixel.

Eleventh Variation of the First Embodiment

Further, it is possible to save data for the approximating polynomials found in equations (3), (4) and (6) (coefficients $a_{k(T)}$, where $1 \leq I \leq J$, and value "const"), as sets of reference data, in the HDD 44 instead of the LUTs 11 and to convert control input values A to DA input values B based on this data when measuring the phase modulation amount. Hence, as in the method of creating the LUTs 11 in the first embodiment (S23), the relationship between the control input values A and DA input values B can be obtained from the data stored in the HDD 44 and equations (4) and (7) by getting equations (5), (9) or (10), depending on a number of time to return to S23. Other various types of sets of reference data can be employed instead of the LUTs 11 or the coefficients for the approximating polynomials.

Second Embodiment

Next, a second embodiment of the present invention will be described with reference to FIGS. 22 through 29. In the first embodiment described above, the LUT 11 is prepared for each pixel to calibrate the voltage-dependent phase modulation characteristics of that pixel. In the second embodiment, a plurality of pixels having similar voltage-dependent phase modulation characteristics are combined in a group, and an LUT 51 is prepared for each group.

Figure 22:
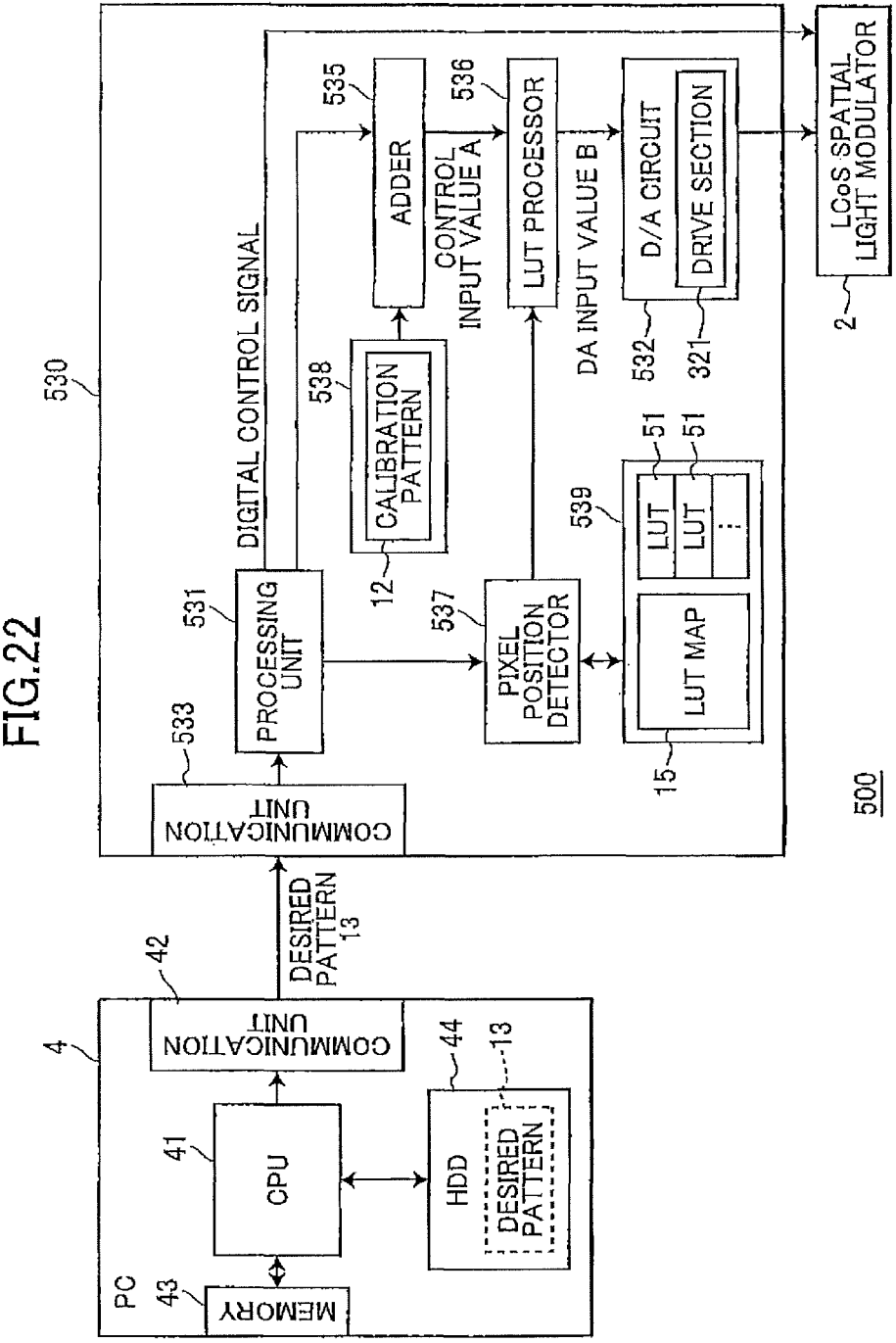
FIG. 22 is a block diagram showing the structure of an LCoS spatial phase modulator according to a second embodiment of the present invention.

As shown in FIG. 22, an LCoS phase modulator 500 according to the present embodiment includes the LCoS spatial light modulator 2, a drive unit 530 for driving the LCoS spatial light modulator 2 with voltage, and the control unit 4. Parts and components similar to the first embodiment described above have been designated with the same reference numerals to avoid duplicating description.

In the second embodiment, the total of T pixels are divided into r groups based on their voltage-dependent phase modulation characteristics. (Here, T and r are positive integers satisfying the expressions T>0, r>0, and T>r. In the preferred embodiment, r is 20.) Hence, each group includes pixels having similar phase modulation characteristics.

As shown in FIG. 22, the control unit 4 has the same construction as the control unit 4 in the first embodiment, but the HDD 44 does not store the LUTs 11 or calibration pattern 12, but stores only the desired pattern 13.

When phase modulation is performed with the LCoS phase modulator 500, the CPU 41 reads the desired pattern 13 into the memory unit 43 from the HDD 44. The CPU 41 transmits the desired pattern 13 as input data to the drive unit 530 via the communication unit 42. The input data of the desired pattern 13 includes pixel position data and a pixel input value for each pixel. As in the first embodiment, the pixel input value is a digital signal having one of N levels from 0 to N−1.

The drive unit 530 includes a communication unit 533, a processing unit 531, an adder 535, an LUT processor 536, a pixel position detector 537, a D/A circuit 532, a RAM 538, and a RAM 539. The D/A circuit 532 includes the drive section 321 described in the first embodiment. The RAM 538 stores the calibration pattern 12. The calibration pattern 12 includes a pixel correction value (digital signals having N levels from 0 to N−1) and pixel position data for each pixel. The drive unit 530 also stores a program for implementing a process, described later, shown in the flowchart of FIG. 27 in a ROM (not shown). The processing unit 531 reads this program from the ROM (not shown) and entirely controls the LCoS phase modulator 500 by executing the program in the phase modulation process.

The RAM 539 stores a single LUT map 15, and r number of LUTs 51 (sets of reference data). The LUT map 15 indicates to which group among the r groups each pixel belongs. The r LUTs 51 have a one-on-one correspondence to the r groups. Each LUT 51 functions to correct voltage-dependent phase modulation characteristics of pixels belonging to the corresponding group. By correcting the voltage-dependent phase modulation characteristics of each pixel in a group with the LUT 51 corresponding to the group to which the pixels belong, it is possible to convert nonlinear characteristics to linear characteristics for each pixel and to correct irregularities in these characteristics among the pixels.

The communication unit 533 receives input data of the desired pattern 13 (the pixel input value and the pixel position) and other data from the control unit 4 and transfers this data to the processing unit 531. The processing unit 531 generates a digital control signal including a vertical synchronization signal and horizontal synchronization signal required for driving the LCoS spatial light modulator 2 based on the desired pattern 13. At the same time, the processing unit 531 transfers the desired pattern 13 to the adder 535. Also at the same time, the processing unit 531 outputs position data for pixels in the desired pattern 13 to the pixel position detector 537.

The adder 535 adds the pixel input values in the desired pattern 13 to the pixel correction values in the calibration pattern 12 for each pixel and sets the control input values A corresponding to these pixels to the sums. If the sums exceed N, the adder 535 also performs a phase fold-back process on the sums and sets the control input values A to the results. The adder 535 transmits the control input value A for each pixel together with the position data for the pixel to the LUT processor 536.

The pixel position detector 537 references the LUT map 15 and determines a group number for the group to which each pixel belongs based on position data for the pixels in the desired pattern 13. The pixel position detector 537 transfers the position data for each pixel and the LUT 51 corresponding to the specified group number (in other words, the LUT 51 corresponding to the position data of the pixel) to the LUT processor 536.

The LUT processor 536 references position data together with the acquired LUT 51 for each pixel and converts the control input value A received together with the position data to a DA input value B. Here, the DA input value B is a digital signal having one of a total of M levels (from 0 to M−1).

The LUT processor 536 converts, for each pixel, the control input value A to the DA input value B with the LUT 51, and the drive section 321 converts the DA input value B to an analog signal C indicating a voltage value within the working voltage range Q-R and applies this voltage to the LCoS spatial light modulator 2.

Figures 25, 26:
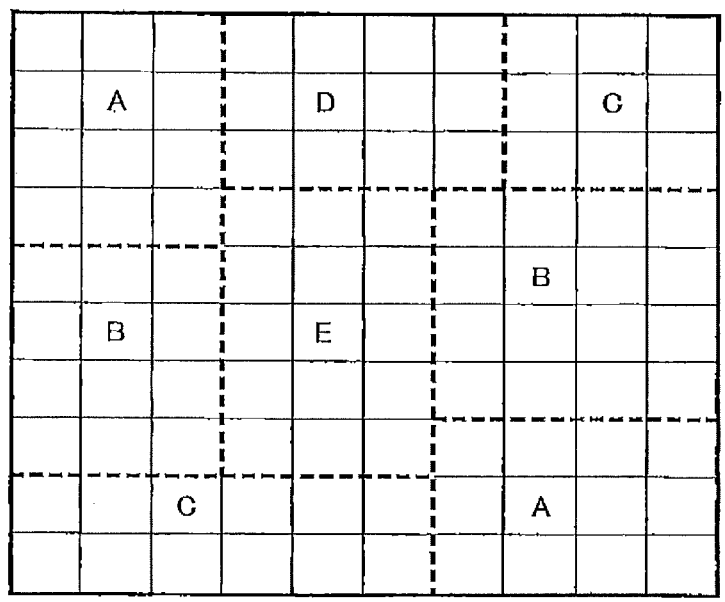
FIG. 25 is an explanatory diagram showing another example of the LUT map.
FIG. 26 is an explanatory diagram of an LUT according to the second embodiment.

The LUT map 15 is created according to a method described later based on characteristics of the LCoS spatial light modulator 2 provided in the LCoS phase modulator 500. FIGS. 23-25 show examples of the LUT map 15. To simplify the description, the value for r in these examples is 4 in FIG. 23, 8 in FIG. 24, and 5 in FIG. 25.

In the examples of the LUT map 15 shown in FIGS. 23-25, the bold lines delineate regions including all pixels, while the thin lines delineate regions corresponding to one pixel. In FIG. 23, one of the group numbers A-D has been assigned to each pixel. In FIG. 24, one of the group numbers A-H has been assigned to each pixel. In FIG. 25, one of the group numbers A-E has been assigned to each pixel. In FIGS. 24 and 25, the same group number has been assigned to pixels positioned in regions delineated by dotted lines.

FIG. 26 shows an example of one of the r LUTs 51. As shown in FIG. 26, the LUT 51 shows correlations between values $t_a$ (first values) from which the control input values A can be selected and values $t_b$ (second values) of DA input values B selected to correspond to the control input values A.

The FIG. 26 also indicates an average value $\phi_{ave}$ of phase modulation amounts $\phi$ attained by whole pixels belonging to a group corresponding to the LUT 51 when the drive section 321 converts the value $t_b$ selected for the DA input value B to a corresponding voltage value and applies a voltage of this value to the pixels belonging to the group. The average value $\phi_{ave}$ in FIG. 26 is given by the average value of the measured phase modulation amounts $\phi$. It is noted that LUTs 51 does not include the average value $\phi_{ave}$. The values $t_a$ taken as the control input values A and the average values $\phi_{ave}$ of phase modulation amounts have a linear relationship. Moreover, the values $t_b$ selected for the DA input values B are set such that the average values $\phi_{ave}$ of phase modulation amounts corresponding to each $t_a$ to be taken as the control input values A are substantially equal in all r LUTs 51. Specifically, the values $t_b$ are set so that $\phi_{ave}=1.5$ for $t_a=0$, $\phi_{ave}=1.508$ for $t_a=1$, etc.

Hence, the drive unit 530 converts a control input value A to a DA input value B for a pixel belonging to the group with the corresponding LUT 51 and converts the DA input value B to an analog signal C and inputs the analog signal C to the LCoS spatial light modulator 2. As a result, the phase modulation amount $\phi$ obtained at that pixel has a substantially linear relationship with the control input value A, with little irregularity among groups.

The calibration pattern 12, LUTs 51, and LUT map 15 are stored in ROM (not shown) in the drive unit 530 and are read into the RAM 538 and RAM 539 when the LCoS phase modulator 500 is started. Alternatively, the calibration pattern 12, LUTs 51, and LUT map 15 may be saved on the HDD 44 of the control unit 4 and may be transferred to the drive unit 530 and loaded in the RAM 538 and RAM 539 when the LCoS phase modulator 500 is started. Further, the RAM 538 and RAM 539 may be integrated into a single RAM for loading the calibration pattern 12, LUT map 15, and LUTs 51.

Figure 27:
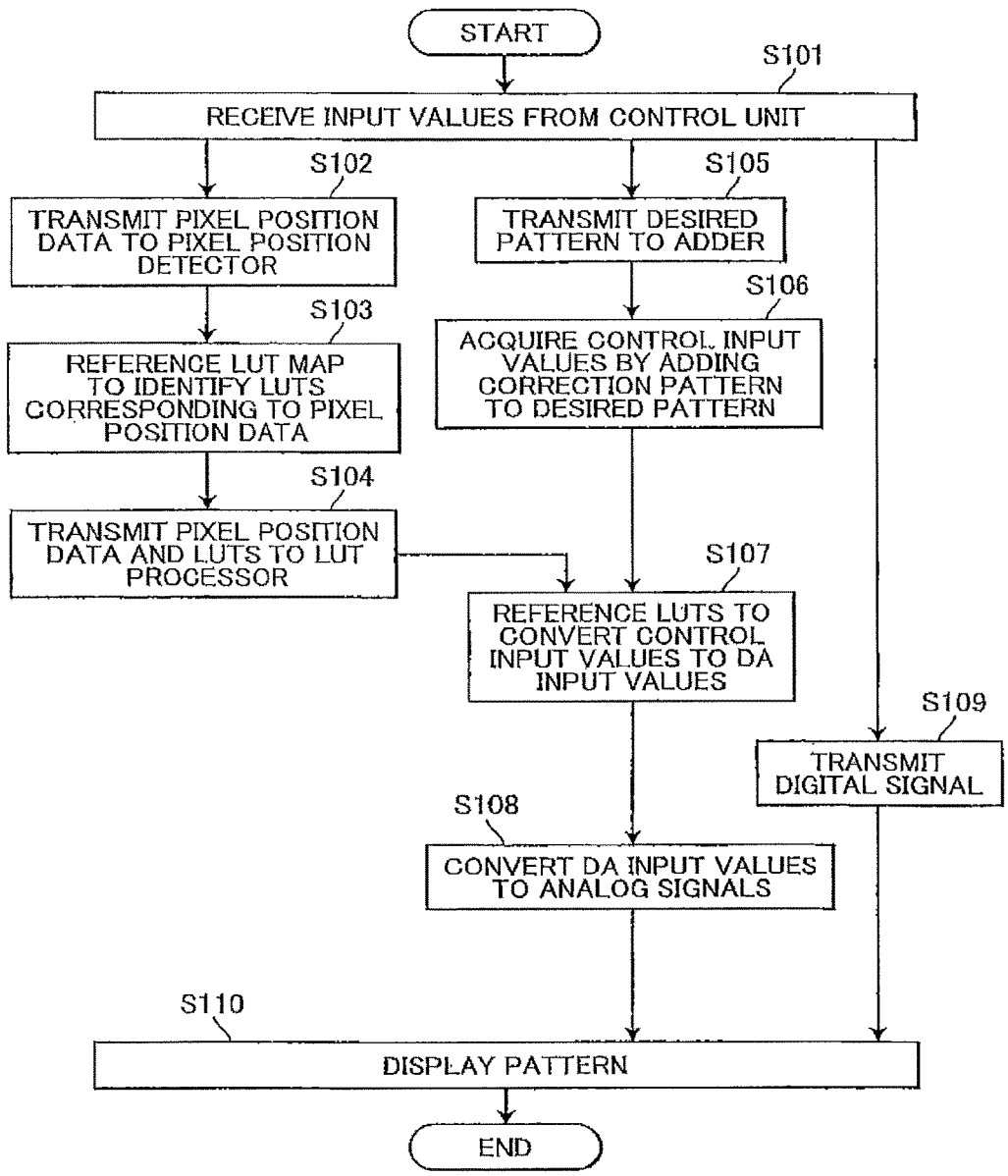
FIG. 27 is a flowchart illustrating steps in a method of phase modulation according to the LCoS phase modulator according to the second embodiment.

The LCoS phase modulator 500 having the above construction performs phase modulation according to the operations shown in FIG. 27. In S101 of FIG. 27, the communication unit 533 receives the input data of desired pattern 13 from the control unit 4 and transfers the input data of the desired pattern 13 to the processing unit 531. In S102 the processing unit 531 transmits position data for each pixel to the pixel position detector 537. In S103 the pixel position detector 537 references the LUT map 15 based on the position data for each pixel to identify the group number of the group to which each pixel belongs. In S104, the pixel position detector 537 transmits, to the LUT processor 536, position data for a pixel and the LUT 51 corresponding to the group number identified for the pixel. The pixel position detector 537 performs this transmission for all pixels.

In parallel with the process in S102, the processing unit 531 also transmits the input data of the desired pattern 13 to the adder 535 in S105. In S106 the adder 535 adds the pixel input values in the desired pattern 13 to the correction input values in the calibration pattern 12 for each pixel and folds back the phase of the sums when necessary. The values obtained in this process are set as the control input values A corresponding to the position data for the corresponding pixels. In S107 the LUT processor 536 converts the control input values A to DA input values B for each pixel while referencing the LUT 51 received from the pixel position detector 537 in S104. In S108 the drive section 321 converts the DA input values B to analog signals C and outputs the analog signals C to the LCoS spatial light modulator 2.

In parallel with the processes of S101 and S105, the processing unit 531 generates a digital signal required for driving the LCoS spatial light modulator 2 in S109.

In S110 the LCoS spatial light modulator 2 modulates the phase of incident light based on the analog signals C received from the drive section 321 in S108 and the digital signal received from the processing unit 531 in S109.

When manufacturing the LCoS phase modulator 500, the drive section 321, LUT map 15, LUTs 51, and calibration pattern 12 are set in correspond each with the LCoS spatial light modulator 2 provided in the LCoS phase modulator 500. The drive unit 530 also stores the program for implementing a process shown in the flowchart of FIG. 27 in the ROM (not shown). These settings are made based on the following procedure performed in the order given. First, minimum and maximum voltages Q and R are set for the working voltage range Q-R of the D/A circuit 532. Next, the LUT map 15 is created, after which the LUTs 51 are created based on the LUT map 15. Further, the calibration pattern 12 is created. Finally, the program for implementing a process shown in the flowchart of FIG. 27 is stored in the ROM (not shown) of the drive unit 530.

Figure 8:
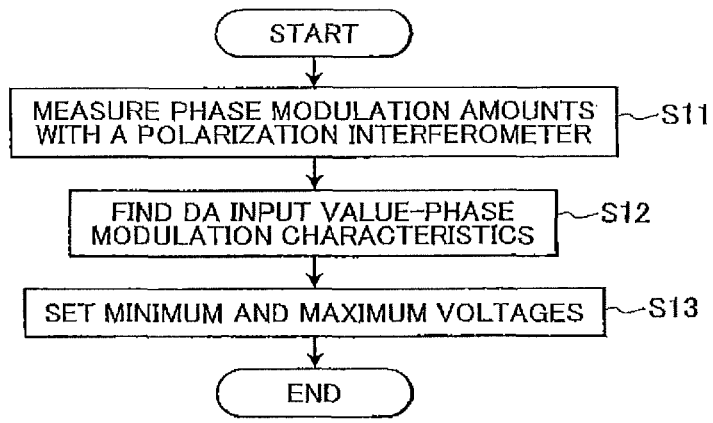
FIG. 8 is a flowchart illustrating steps in a method of setting minimum and maximum values of voltage for driving the LCoS spatial light modulator.

The method of setting the drive section 321 is identical to the method described in FIG. 8 of the first embodiment. Specifically, the drive section 321 is set for linearly converting the DA input values B from 0 to 4,095 to analog signals C indicating voltage values within the working voltage range Q-R.

Figure 28:
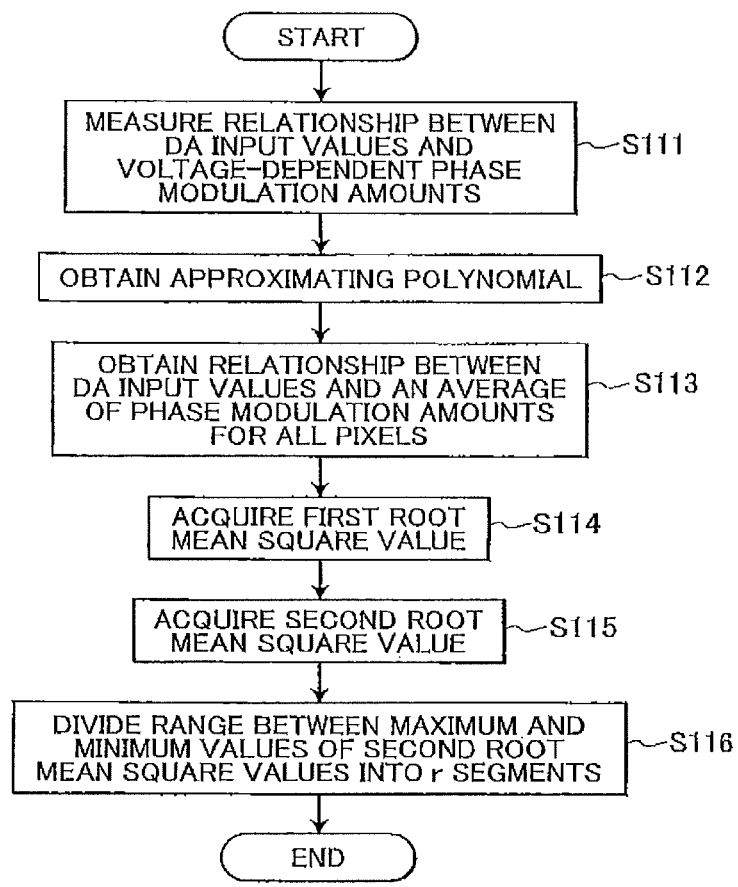
FIG. 28 is a flowchart illustrating steps in a method of creating an LUT map.

Next, a method of creating the LUT map 15 will be described with reference to FIG. 28. In S111 of FIG. 28, the LCoS phase modulator 500 is disposed in the polarization interferometer 60 shown in FIG. 9, and the polarization interferometer 60 is used to find the relationship between DA input values B and voltage-dependent phase modulation amounts for each pixel of the LCoS spatial light modulator 2. This measurement process is identical to S21 described in FIG. 12. Specifically, measurements are repeatedly performed while varying the DA input value B from 0 to 4,095.

In S112 the least-squares method or the like is used in the following polynomial of equation (11) to approximate the relationship between the phase modulation amounts $\phi$ and the DA input values ($t_b$) based on the DA input values-phase modulation characteristics found for each pixel in S111. The relationship $t_b(\phi)$ in equation (11) is found for all pixels.

$$t_b(\phi) = f(\phi) = \sum_{k=0}^{K} a_k \phi^k \quad (11)$$

In S113 a relationship is obtained between the DA input value B and the value obtained by averaging out the phase modulation amounts φ that all pixels attain when being applied with a voltage corresponding to the DA input value B. More specifically, first an average value of phase modulation amounts for all pixels is obtained for each DA input value B. From these values, the relationship between each DA input value B and an average value φ of phase modulation amounts is found through approximation. For example, the relationship can be obtained using a K-th polynomial, such as that in equation (12) below, where $t_{b,ave}(\phi)$ represents the DA input value B.

$$t_{b,ave}(\phi) = \sum_{k=0}^{K} a_{k,ave} \phi^k \quad (12)$$

In S114 a Root Mean Square (RMS) value $\in_1$ (hereinafter referred to as a first RMS value) for the DA input values $t_{b,ave}(\phi)$ for averaged phase modulation amounts, found in equation (12), and the DA input values $t_b(\phi)$ are found for each pixel using equation (13) below.

$$\varepsilon_1 = \left( \int_0^{2\pi} |t_{b,ave}(\phi) - t_b(\phi)|^2 \, d\phi \right)^{1/2} \quad (13)$$

Next, the pixel having the largest first RMS value $\in_1$ (max RMS pixel) among all pixels is found. The max RMS pixel is determined to be the pixel whose phase modulation amount φ is furthest separated from the average phase modulation amount of all pixels.

In S115 a Root Mean Square value $\in_2$ (hereinafter referred to as a second RMS value) for the DA input values of the max RMS pixel (hereinafter referred to as $t_{MAX}(\phi)$) and the DA input values $t_b(\phi)$ are found for each pixel using equation (14) below.

$$\varepsilon_2 = \left( \int_0^{2\pi} |t_{MAX}(\phi) - t_b(\phi)|^2 \, d\phi \right)^{1/2} \quad (14)$$

In S116 the maximum value of the second RMS value $\in_2$ among all pixels is found. The minimum value of the second RMS values $\in_2$ found for all pixels is 0 because $t_b(\phi) = t_{MAX}(\phi)$ for the max RMS pixel. A range between the maximum value and the minimum value of the second RMS value $\in_2$ is divided into r divisions at even intervals. Next, pixels having a second RMS value $\in_2$ belonging to the same division are combined in a single group for each division, thereby configuring one group for each division and distributing all pixels among r=20 groups. Subsequently, the relationship between pixels and the groups to which the pixels belong is saved in the LUT map 15.

In this way, the LUT map 15 is configured by combining pixels belonging to the same division in a single group, where pixels in a division have a similar amount $\in_2$ indicating the voltage-dependent phase modulation characteristics of the pixel. Hence, this method makes it possible to combine pixels having similar voltage-dependent phase modulation characteristics in a single group.

The example of the LUT map 15 shown in FIG. 23 is created for one example of the LCoS spatial light modulator 2 in which pixels having similar voltage-dependent phase modulation characteristics are distributed substantially uniformly throughout the entire pixel region. Hence, pixels belonging to groups A-D have been distributed substantially uniformly throughout the entire pixel region. The example of the LUT map 15 shown in FIG. 24 is created for another example of the LCoS spatial light modulator 2 in which adjacent pixels have similar properties. Pixels within regions delineated by dotted lines have similar characteristics and thus belong to the same group.

Further, depending on the phase modulation characteristics of the LCoS spatial light modulator 2, adjacent pixels as well as pixels in separated regions may be included in the same groups, as in groups A, B, and C shown in FIG. 25.

The method of grouping pixels employed in S116 described above may be modified to one of the following methods [1]-[6].

[1] When dividing pixels into groups according to the above method, there are some cases in which all pixels are not uniformly distributed among the r groups, depending on the characteristics of the LCoS spatial light modulator 2. In other words, it is possible that the number of pixels belonging to each group may deviate greatly from T/r. With method [1], it is possible to distribute all pixels among r groups with relative uniformity. That is, the number of pixels belonging to each group can be set to approximately T/r. Specifically, the method of dividing pixels into groups in S116 is modified as follows. First, the second RMS values $\in_2$ obtained for all pixels are arranged in ascending (or descending) order. In other words, the second RMS values $\in_2$ for all pixels are arranged in a sequence. This sequence is partitioned at substantially fixed intervals, forming r segments of the entire series. As a result, the number of pixels included in one segment is approximately T/r, with the number of pixels in each segment approximately equal.

[2] It is also possible to preset the reference value $t_{MAX}(\phi)$. In this case, S113 and S114 are not executed.

[3] When it is known that a certain pixel has remarkably different properties from the other pixels when manufacturing the LCoS spatial light modulator 2, this pixel has the greatest value of all first RMS values $\in_1$. In this case, the value obtained from equation (11) for this pixel can be set as the reference value $t_{MAX}(\phi)$, and S113 and S114 are not executed.

[4] In S114 it is also possible to find the phase modulation amount φ for only a certain single DA input value B (the minimum value 0, for example) for each pixel. In this method, the processes in S112 through S115 are skipped, and the pixels are grouped in S116 based on the measured phase modulation amounts φ. Here, the phase modulation amounts φ for all pixels are arranged in ascending (or descending) order, i.e. the phase modulation amounts φ are arranged in a sequence. The sequence of phase modulation amounts φ is partitioned at fixed intervals, producing r segments. Accordingly, T/r phase modulation amounts φ are arranged in a single segment. Pixels that attain the phase modulation amounts φ included in the same segment are combined in the same group. Hence, T/r pixels attaining a similar phase modulation amount relative to the same DA input value B can be combined in the same group, thereby distributing a substantially equal number of pixels in each group.

Further, instead of arranging the phase modulation amounts φ for all pixels in ascending order or descending order, the range of phase modulation amounts between a maximum value and minimum value may be divided into r segments or equal length. Pixels having a phase modulation amount φ of a value in the same segment are combined in the same group. However, in this case, the number of pixels belonging to a single group may deviate greatly from T/r.

[5] In S111 it is possible to use a DA input value for a specified pixel instead of the DA input average value $t_{b,ave}$ (φ). In this case, the first RMS value is obtained by modifying equation (13) as shown in a following $\in_1'$. Here $t_{b,0}(\phi)$ represents the DA input value for specified pixel.

$$\varepsilon_1' = \left( \int_0^{2\pi} |t_{b,0}(\phi) - t_b(\phi)|^2 \, d\phi \right)^{1/2}$$

In the above-described embodiment, pixels are grouped by the scalar quantization. However, the method of grouping pixels is not limited to the methods described above. For example, after finding the results in equation (11) for all pixels, vector quantization, or another type of scalar quantization may be used to divide pixels with similar properties into r groups.

Figure 29:
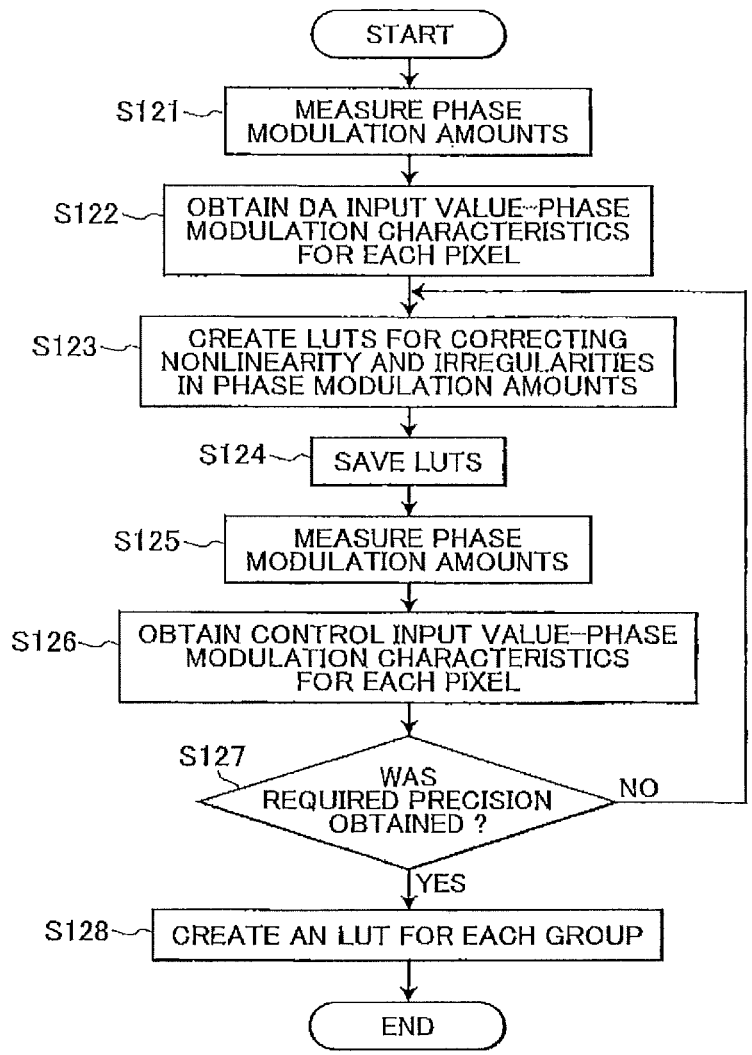
FIG. 29 is a flowchart illustrating steps in a method of creating an LUT according to the second embodiment.

Next, a method of creating the LUT 51 for each group will be described with reference to FIG. 29. In FIG. 29, S121-S127 are identical to S21-S27 in the first embodiment when creating the LUT 11 for each pixel. Thus, the LUT 11 is created for each pixel in the same manner as the LUT 11 is created in the first embodiment. Accordingly, in S121-S127, values are found using equations (3)-(10), as described in the first embodiment. Data acquired for each pixel through equations (3)-(10) is temporarily stored in the HDD 44.

More specifically, in S124 the LUTs 11 are saved in the HDD 44 for each pixel and are temporarily used for finding the LUT 51 for each group. When subsequently measuring phase modulation amounts in S125, the LUTs 11 corresponding to positions of pixels specified by the pixel position detector 537 are read from the HDD 44 and transferred to the RAM 539 of the drive unit 530.

In S125 the LUT processor 536 converts the control input values A (0-255) to DA input values B based on the LUT 11 for each pixel just obtained in S124, after which the drive section 321 converts the DA input values B to analog signals C for driving the corresponding pixels in the LCoS spatial light modulator 2. In S128 a LUT 51 for each group is created based on the LUTs 11 for each pixel found in S121-S127.

In S128 a LUT 51 is created for each group based on the LUTs 11 obtained for all pixels belonging to the group. Specifically, an average value of phase modulation amounts φ (hereinafter referred to as average phase modulation amount $\phi_{g-ave}$) acquired for all pixels within a group are obtained for each DA input value ($t_b$). That is, the phase modulation amount φ is measured by using the LUTs 11 for each pixels. The average phase modulation amount $\phi_{g-ave}$ is obtained by averaging the measured phase modulation amounts φ for all pixels in a group. However, when pixels in which characteristics of phase modulation amount φ is unusual compared to pixels in same group are exist, the average phase modulation amount $\phi_{g-ave}$ is obtained by averaging the measured phase modulation amount φ for pixels except the unusual pixels in group. The average phase modulation amount $\phi_{g-ave}$ is obtained for each group.

Next, for each group, the relationship between the DA input values $t_b$ or the control input values $t_a$ and the average phase modulation amount $\phi_{g-ave}$ is found through an approximation. The LUT 51 for each group indicating the relationship between the control input values $t_a$ and the DA input value $t_b$ is found based on this approximation. The LUT 51 found for each group in this way is stored in ROM (not shown) in the drive unit 3. Further, the LUTs 11 are deleted from the HDD 44.

Next, a method of finding, for each group, the approximation indicating the relationship between the DA input value $t_b$ or control input values $t_a$ and the average phase modulation amount $\phi_{g-ave}$, and the relationship between the control input values $t_a$ and DA input value $t_b$ based on this approximation will be described in detail for the following three cases (1)-(3).

(1) In some cases, the process of FIG. 29 may not return from S127 to S123, but may advance to S128 without updating the LUTs 11 acquired from measurement results in S122. In these cases, the LUTs 11 are acquired based on results of the first measurements.

(2) In some cases, the process of FIG. 29 may return once from S127 to S123, advancing to S128 after performing the process in S125 once. In this case, the LUTs 11 are acquired by updating the LUTs 11 based on second measurements (i.e., the first measurements performed in S125).

(3) In some cases, the process of FIG. 29 may repeatedly loop back from S127 to S123 two or more times, advancing to S128 after performing the process in S125 two or more times. In these cases, the LUTs 11 are acquired after performing updates based on an $M^{th}$ (where M is a natural number greater than or equal to 3) measurement (i.e., the $(M-1)^{th}$ measurements performed in the process of S125).

<Case (1)>

First, an approximation indicating the relationship between the DA input value $t_b$ and the average phase modulation amount $\phi_{g-ave}$ acquired in the first measurement is found as follows.

$$t_{b(1)} = f_{1,g-ave}(\phi_{g-ave}) = \sum_{k(1)=0}^{K} a_{k(1),g-ave} \phi_{g-ave}^{k(1)} \tag{15}$$

In order to achieve a linear relationship between the control input values $t_a$ and the average phase modulation amount $\phi_{g-ave}$ found in the first measurement and to express 0.0-2.0π [rad] with 256 levels of control input values A, the relationship between the control input values $t_a$ and average phase modulation amount $\phi_{g-ave}$ is expressed as follows, where $t_{a(M)}$ represents the control input values and M=1.

$$\phi_{g-ave}(t_{a(M)}) = (2\pi/256) \times t_{a(M)} + const \tag{16}$$

$t_{a(M)}$ e is an integer value from 0 to 255, and const is the same offset value for all groups. The following relationship in equation (17) can be obtained by substituting equation (16) into equation (15).

$$t_{b(1)} = f_{1,g-ave}(\phi_{g-ave}(t_{a(1)})) \tag{17}$$

Equation (18-1) below is obtained by rounding off the right side of equation (17).

$$t_{b(1)} = \text{ROUND}[f_{1,g-ave}(\phi_{g-ave}(t_{a(1)}))] \tag{18-1}$$

Equation (18-1) indicates the relationship between the DA input values ($t_{b(1)}$) and the control input values ($t_{a(1)}$). The LUT 51 is created based on this relationship indicated by equation (18-1).

<Case (2)>

First, an approximation showing the relationship between the previous control input values $t_a$ and the current average phase modulation amount $\phi_{ave}$ is found as follows, where M=2.

$$t_{a(M-1)} = f_{M,g-ave}(\phi_{ave}) = \sum_{k(M)=0}^{K} a_{k(M),g-ave}\phi_{g-ave}^{k(M)} \quad (19)$$

By substituting equation (16) into equation (19) for M=2, the following relationship in equation (20) is obtained.

$$t_{a(M-1)} = f_{M,g-ave}(\phi_{g-ave}(t_{a(M)})) \quad (20)$$

By substituting equation (20) into equation (18-1), the following equation (18-2) is obtained.

$$t_{b(2)} = \text{ROUND}[f_{1,g-ave}(\phi_{g-ave}(f_{2,g-ave}(\phi_{g-ave}(t_{a(2)}))))] \quad (18\text{-}2)$$

Equation (18-2) indicates the relationship between DA input values ($t_{b(2)}$) and control input values ($t_{a(2)}$). The LUT 51 is created based on the relationship indicated by this equation (18-2).

<Case (3)>

Equation (18-3) below is obtained according to the same method described in Case (2). Accordingly, equation (18-3) is obtained as follows.

$$t_{b(M)} = \text{ROUND}[f_{1,g-ave}(\phi_{g-ave}(f_{2,g-ave}(\ldots f_{M,g-ave}(\phi_{g-ave}(t_{a(M)}))))] \quad (18\text{-}3)$$

Equation (18-3) indicates the relationship between DA input values ($t_{b(M)}$) and control input values ($t_{a(M)}$), wherein M is greater than 2. The LUT 51 is created based on the relationship indicated by this equation (18-3).

Instead of obtaining an average value $\phi_{g-ave}$ for phase modulation amounts $\phi$ within a group, it is possible to obtain a value producing the least amount of variance in phase modulation amounts $\phi$ within the group and to create the LUT 51 based on the value.

The LUT 51 shown in FIG. 26 holds the relationships among the $t_a$, $t_b$, and average phase modulation amounts $\phi_{g-ave}$ obtained for the corresponding group in the process described above. A linear relationship can be attained between the control input values A and phase modulation amounts $\phi$ for pixels belonging to the subject group by referencing this LUT 51 when performing the conversion in S107 (FIG. 27). Use of the LUT 51 can correct irregularities in phase modulation amounts among each pixel in a group to achieve substantial linearity in the relationship between the control input values A and the phase modulation amounts. Moreover, since the equations (18-1), (18-2), or (18-3) are created such that the equation (16) is satisfied for all groups, irregularities in phase modulation amounts among pixels can be corrected to achieve substantial linearity in the relationship between the control input values A and phase modulation amounts across all pixels and to achieve substantial same phase modulation amounts for the same control input values A.

After creating the LUT 51 for each group according to the above method, the calibration pattern 12 is created. The method of creating the calibration pattern 12 is identical to the method of creating the calibration pattern according to the first embodiment described with reference to FIG. 15. That is, in S31 the drive unit 530 stores a pattern having 0s for all pixel values in the RAM 538 as the initial calibration pattern 12. In S32 the CPU 41 sets the desired pattern 13 to an image in which all pixel values are identical within 0-255, and transmits the desired pattern 13 to the drive unit 530. The pixel input values in the desired pattern 13 received in the drive unit 530 are transferred to the adder 535, while position data for pixels in the desired pattern 13 are transferred to the pixel position detector 537. The pixel position detector 537 identifies corresponding LUTs 51 based on the position data. In S33 and S41, the adder 535 adds the pixel input values in the desired pattern 13 to the pixel correction values in the calibration pattern 12 and sets the control input values A to the sums, after folding back the phase if needed. In S34 and S42, the LUT processor 536 converts the control input values A to DA input values B based on the identified LUTs 51 and transfers the DA input values B to the D/A circuit 532. In S35 the drive section 321 generates the analog signals C based on the DA input values B and applies a working voltage to the LCoS spatial light modulator 2 based on the analog signals C. In S39 the phase values (phase modulation amounts) for each pixel in the calibration pattern 12 are converted to control input values while referencing the equation (4) or (7), data of which are stored in the HDD 44, and re-expressed in one of 256 levels. It is also possible to store data for the average phase modulation amounts in the LUT 51 as shown in FIG. 26 and to obtain the calibration pattern in 256 levels expression by using this LUT 51. In S40 the calibration pattern 12 expressing the acquired phase values in 256 levels is stored in ROM (not shown).

In the LCoS phase modulator 500 according to second embodiment described above, all pixels are distributed among a plurality of groups based on their phase modulation characteristics, and the same LUT 51 is used for all pixels within a single group. Since there is no need to have a LUT 51 for each pixel, the phase modulation characteristics for all pixels can be corrected efficiently with less data. Hence, the LUTs 51 can be stored on the drive unit 3, even when the drive unit 3 is a type that cannot easily be equipped with high-capacity memory (RAM).

Further, since the LUTs 51 are stored in the drive unit 530, dedicated hardware (the adder 535, pixel position detector 537, and LUT processor 536) are used to perform (i) the process for adding the desired pattern 13 to the calibration pattern 12 and folding back the phase when necessary (performed on the adder 535), (ii) the process for acquiring pixel position data (performed on the pixel position detector 537), and (iii) the process for converting the control input values A to DA input values B based on the LUTs 51 and for outputting the DA input values B to the LCoS spatial light modulator 2 (performed on the LUT processor 536). The processing time required for processes (i)-(iii) performed on the drive unit 3 can be reduced, for example, over the processing time required for the same processes performed by the CPU 41 on the control unit 4, thereby enabling the processes to be completed within one frame.

The LUT map 15 provides correlations between the pixel position data and group numbers, making it possible to reliably select a LUT 51 suited to the characteristics of a pixel when performing phase modulation.

The LCoS phase modulator 500 according to the second embodiment described above controls the LCoS spatial light modulator 2 for DA input values B expressed in 4,096 levels within the working voltage range smaller than the operable voltage range that ensures the required range of the phase modulation amounts. Hence, the LCoS phase modulator 500 can control the voltages applied to the LCoS spatial light modulator 2 with great accuracy. Moreover, the LCoS phase modulator 500 employs the LUTs 51 to achieve a substantially linear relationship between the control input values A and the voltage-dependent phase modulation amounts and corrects irregularities among pixels caused by voltage-dependent phase modulation amount, thereby obtaining the desired phase modulation amounts with great accuracy. Further, the LCoS phase modulator 500 uses the calibration pattern 12 to correct voltage-independent distortion to achieve more accurate phase modulation.

It was found that the output wavefront could be measured with greater precision when performing correction using the LUT map 15, LUTs 51, and calibration pattern 12 in the preferred embodiment than either (i) when performing no correction, or (ii) when performing correction using a single LUT 51 and calibration pattern 12 for all pixels. For example, RMS values for a control input value-measured phase modulation characteristics and a control input value-ideal phase modulation characteristics are as shown in a following table.

|  | (i) no correction | (ii) single LUT | First embodiment | Second Embodiment |
|---|---|---|---|---|
| RMS value | $0.70\lambda$ | $0.10\lambda$ | $0.01\lambda$ | $0.05\lambda$ |

As shown in this table, the phase modulation characteristics become accurate by using the LUTs 11 or 51 and the calibration pattern 12. Though the correction of the first embodiment gives highest accuracy, the correction of the second embodiment gives enough accuracy for measurement. In fact, a pattern of concentric circles can be seen similar to FIG. 17(A) when phase modulation for a Laguerre-Gaussian beam is measured on the LCoS phase modulator 500 by using the LUTs 51 and the calibration pattern 12.

Further, when creating the LUTs 51 and when creating the calibration pattern 12, the process is repeated until either the required precision is obtained or until an improvement in precision is not obtained. Thus, it is possible to obtain highly accurate LUTs 51 and a highly accurate calibration pattern 12 capable of accurately correcting voltage-dependent phase modulation characteristics and voltage-independent distortion.

First Variation of the Second Embodiment

It is also possible to use the LCoS spatial light modulator 120 shown in FIG. 18 instead of using the LCoS spatial light modulator 2.

Second Variation of the Second Embodiment

The functions of the control unit 4 may also be incorporated in the drive unit 530. In this case, the RAM 538 also stores the desired pattern 13. The desired pattern 13 is saved in ROM (not shown) in the drive unit 530 and read into the RAM 538 when the LCoS phase modulator 500 is started.

Third Variation of the Second Embodiment

Figure 30:
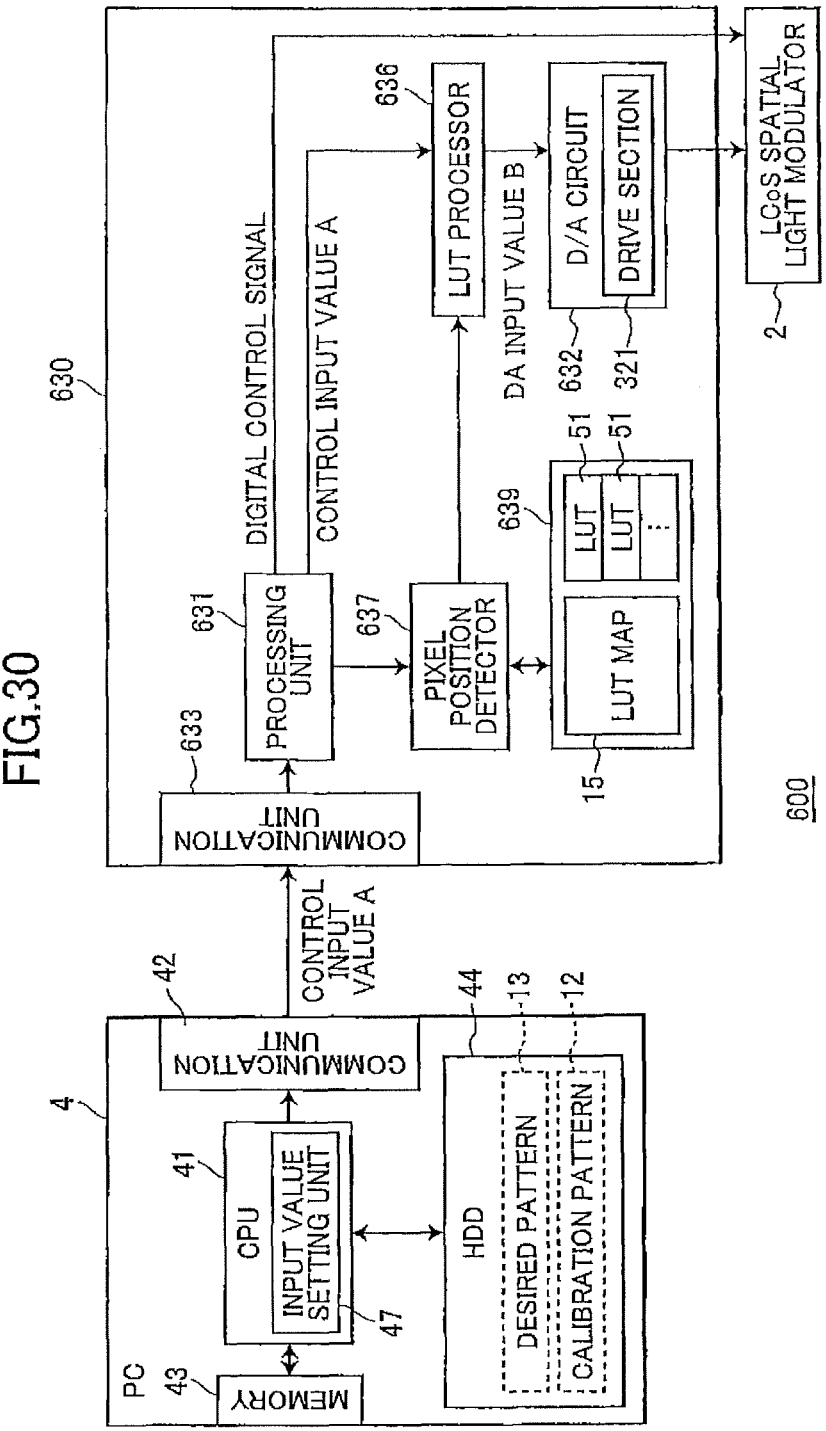
FIG. 30 is a block diagram showing the structure of an LCoS phase modulator according to a third variation of the second embodiment.

In the LCoS phase modulator 500 according to the preferred embodiment described above, the calibration pattern 12 is stored in the RAM 538 of the drive unit 530, and the adder 535 adds the pixel input values in the desired pattern 13 to the pixel correction values in the calibration pattern 12. However, as in the example of the LCoS phase modulator 600 shown in FIG. 30, the desired pattern 13 and calibration pattern 12 may be stored in the HDD 44, read into the memory unit 43, and added in the control unit 4. In this case, the CPU 41 includes the input value setting unit 47 that functions to add the pixel input values of the desired pattern 13 to the pixel correction values of the calibration pattern 12. A drive unit 630 of the LCoS phase modulator 600 is not provided with an adder or RAM for storing the calibration pattern. Specifically, the drive unit 630 includes a communication unit 633, a processing unit 631, a pixel position detector 637, an LUT processor 636, a D/A circuit 632, and a RAM 639. Of these, the communication unit 633 and D/A circuit 632 are identical to the communication unit 33 and D/A circuit 32 shown in FIG. 2. The RAM 639 stores the LUT map 15 and the LUTs 51, and the D/A circuit 632 is provided with the drive section 321.

For phase modulation, the input value setting unit 47 adds the pixel input values of the desired pattern 13 to the pixel correction values of the calibration pattern 12 and sets the control input values A to these sums, after folding back the phase in the sums when necessary. The communication unit 42 transmits the control input values A and pixel position data to the drive unit 630. The communication unit 633 transfers the control input values A and pixel position data to the processing unit 631. The processing unit 631 transfers position data of pixels to the pixel position detector 637 and transfers the control input values A for these pixels to the LUT processor 636. Thereafter, the LUT processor 636 and the D/A circuit 632 perform the same process as the processor 536 and the D/A circuit 532 according to the second embodiment to modulate the phase of incident light on the LCoS spatial light modulator 2. Since the LCoS phase modulator 600 described above does not need to add the calibration pattern 12 and desired pattern 13 in the drive unit 630, it is possible to reduce the capacity of RAM provided in the drive unit 630.

Fourth Variation of the Second Embodiment

Figure 31:
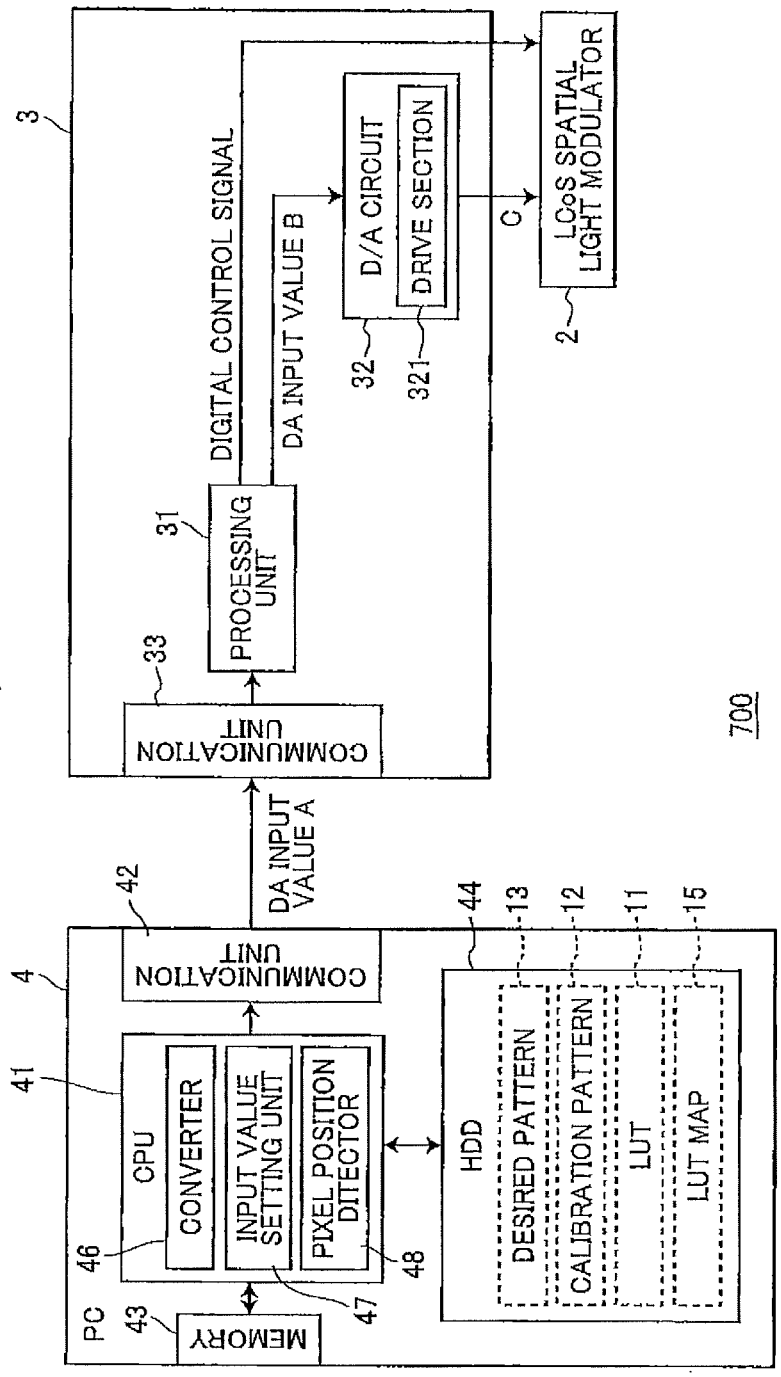
FIG. 31 is a block diagram showing the structure of an LCoS phase modulator according to a fourth variation of the second embodiment.

It is also possible to save the desired pattern 13, calibration pattern 12, LUTs 51, and LUT map 15 in the HDD 44, read this data into the memory unit 43, and find and transmit the DA input values B to the drive unit 3, as in a LCoS phase modulator 700 shown in FIG. 31. In this construction, the CPU 41 includes a converter 46, an input value setting unit 47, and a pixel position detector 48. The drive unit 3 is identical to the drive unit 3 shown in FIG. 2.

For phase modulation, the input value setting unit 47 adds the pixel input values of the desired pattern 13 to the pixel correction values of the calibration pattern 12, setting the sums as the control input values A after performing phase fold-back when necessary. The pixel position detector 48 references the LUT map 15 to identify group numbers corresponding to the pixel position data. The converter 46 converts the control input value A for each pixel to a DA input value B using the LUT 51 corresponding to the identified group number. The communication unit 42 transmits the DA input values B to the drive unit 3. The communication unit 33 transfers the DA input values B received from the communication unit 42 to the processing unit 31. The remaining process is identical to that described in the first embodiment for modulating the phase of incident light on the LCoS spatial light modulator 2. With the LCoS phase modulator 700 having this configuration, the drive unit 3 need not be provided with RAM for saving the desired pattern 13, LUTs 51, LUT map 15, and calibration pattern 12, thereby reducing the cost of the device.

Fifth Variation of the Second Embodiment

While the D/A circuit 532 is provided in the drive unit 530 in the second embodiment described above, the D/A circuit may be separated from the drive unit 530, and the LCoS spatial light modulator may be provided with the D/A circuit and a reception circuit for receiving the DA input values B. With this construction, the drive unit 530 transfers the DA input values B to the reception circuit on the LCoS side.

Sixth Variation of the Second Embodiment

Further, in the drive unit 530 of the second embodiment, the RAM 539 stores the LUT map 15 and the LUTs 51. However, another RAM may be directly connected to the LUT processor 536 and may stores the LUTs 51. In this case, the RAM 539 only store the LUT map 15. In the second embodiment, the LUTs 51 are read into the LUT processor 536 via the pixel position detector 537. However, in this variation, the LUT processor 536 reads the LUTs 51 directly from the other RAM. With this configuration, the pixel position detector 537 transmits to the LUT processor 536 data indicative of the LUTs 51 identified with reference to the LUT map 15. The LUT processor 536 performs an LUT process (process for converting the control input values A to DA input values B), while referencing the LUTs 51 stored in the other RAM according to the data received from the pixel position detector 537.

Seventh Variation of the Second Embodiment

While the drive unit 530 shown in FIG. 22 is provided with only one D/A circuit 32, the drive unit 530 may be given a plurality of D/A circuits 532 for simultaneously outputting a plurality of analog signals C to the LCoS spatial light modulator 2 in order to simultaneously write analog signals to a plurality of pixels. In the drive unit 530 having this construction, the process circuit of the drive unit 530 is configured to simultaneously output DA input values B for a plurality of pixels to the D/A circuits 532.

Eighth Embodiment of the Second Embodiment

The D/A circuit 532 may also be replaced with a pulse modulation circuit. With this construction, the pulse modulation circuit outputs a digital pulse modulation signal for driving the LCoS spatial modulator.

Ninth Variation of the Second Embodiment

Further, it is possible to save data for the approximating polynomials found in equations (15), (16) and (19) (coefficients $a_{k(I),g\text{-}ave}$, where $1 \leq I \leq J$, and value "const"), as sets of reference data, in the ROM (not shown) in the drive unit 530 instead of the LUTs 51. As in the method of creating the LUTs 51 in the second embodiment (S128), depending on a number of times to return to S123, the equations (18-1)-(18-3) are obtained by using this data. Hence, the relationship between the control input values A and DA input values B can be obtained from the equations (18-1)-(18-3). When measuring the phase modulation amount, the LUT processor 536 converts control input values A to DA input values B based on this data (S107). Other various types of sets of reference data can be employed instead of the LUTs 51 or the coefficients for the approximating polynomials.

Tenth Variation of the Second Embodiment

When creating the LUTs 51 and the LUT map 15 in the preferred embodiment described above, measurements are performed for all pixels. However, it is also possible to measure phase modulation amounts only for representative pixels rather than all pixels. For example, blocks may be configured of a plurality of neighboring pixels, where one block includes 4×4 pixels, for example. One pixel in each block is set as a reference pixel, and measurements are only performed on the representative pixels. All the blocks are divided into several groups based on the results of these measurements, and the LUT map 15 is created to indicate these groups. More specifically, the LUT map 15 indicates the relationship between blocks and the LUTs 51 corresponding to the blocks. In this example, the same LUT 51 is applied to all pixels within a single block.

Eleventh Variation of the Second Embodiment

As shown in FIG. 32, the values of the calibration pattern 12 may be included in the LUTs 51. This variation is similar to the variation of the seventh variation of the first embodiment shown in FIG. 21. That is, data for correcting voltage-independent distortion can be included in the LUT 51 by shifting the reference position in the LUT 51 for each group by a value in the calibration pattern for the one pixel that belongs to the subject group. Or, this shifting value may be an average value for all pixels in the calibration pattern in the subject group. FIG. 32 has included data for correcting voltage-independent distortion in the data of FIG. 26, with p=64. For example, the value of $t_b$ is 1,050 when $t_a$ is 0 in the table of FIG. 26, but this value of $t_b$ appears when $t_a$ is 64 in FIG. 21.

In this case, the drive unit 530 in FIG. 22 need not include the adder 535 and the RAM 538. Further, steps S106 are not required in the phase modulation method described with reference to FIG. 27. Thus, the process unit 531 transmit the input values to the LUT process unit 536. The LUTs 51 that include the values of calibration pattern 12 as shown in FIG. 32 are used in S103, 104, and 107. Hence, the drive unit 530 can also correct voltage-independent distortion simply by applying the LUTs 51 that include the calibration pattern, thereby eliminating the need to save the calibration pattern and to perform a process to add the calibration pattern to the desired image.

The LUTs 51 including the calibration pattern can be created by units of blocks. The LUTs 51 are divided into blocks according to the same method described above. In this case, the phase modulation characteristics are measured for at least one pixel in a block, and the correction value for each pixel in the block is set to the average value of correction values for each pixel that are found in the block. Alternatively, when the phase modulation characteristics are measured for only one pixel in a block, the correction value for the block may be simply set to the correction value for that pixel rather than an average value. The size and position of the blocks in the LUTs 51 and the calibration pattern 12 are identical to each other. The value for each block in the calibration pattern 12 is simply reflected in the corresponding block constituting the LUTs 51.

In this way, data in the calibration pattern 12 can be included in the LUTs 51 for correcting voltage-independent distortion while the LUTs 51 are used to convert control input values A to DA input values B. Therefore, the process of adding the calibration pattern 12 may be omitted, achieving more efficient phase modulation.

Twelfth Variation of the Second Embodiment

Figure 33A:
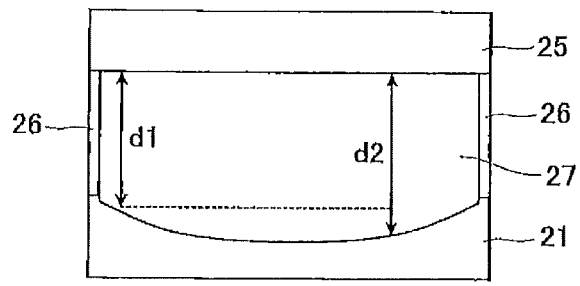
FIG. 33(A) is an explanatory diagram illustrating the thickness of a liquid crystal layer in the LCoS spatial light modulator.

Distortion does not occur in the glass substrate 25 of the LCoS spatial light modulator 2 since the glass substrate 25 is made considerably thick (3 mm, for example). The problem of distortion occurs only in the silicon substrate 21, as illustrated in FIG. 33(A). The orientation layers 23 and electrode 24 have been omitted from the drawings in FIGS. 33(A) (and 33(B), described later). The thickness of the liquid crystal layer 27 shown in FIG. 33(A) varies according to distortion in the silicon substrate 21, as indicated by distances d1 and d2.

Pixels have the same phase modulation amounts when the corresponding region of the liquid crystal layer 27 has the same thickness so as to apply an equal voltage. Based on this knowledge, if the glass substrate 25 is formed thick and the shape of distortion in the silicon substrate 21 is known, it is possible to determine which pixels have the same phase modulation amounts. Hence, in place of the method for creating the LUT map 15 shown in FIG. 28, the LUT map 15 can be found by measuring quantities indicating the distorted shape of the silicon substrate 21 according to one of the following three methods 1-3, for example.

Figure 34:
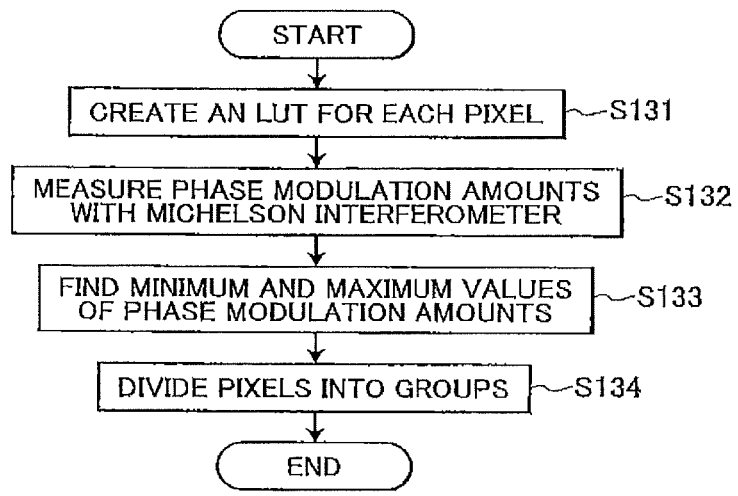
FIG. 34 is a flowchart illustrating steps in a method of creating an LUT map according to a variation of a twelfth variation of the second embodiment.

1. This method will be described with reference to FIG. 34. In S131 of FIG. 34, LUTs 11 are created for all pixels. Specifically, the processes in S121-S127 shown in FIG. 29 are executed. In S132 the Michelson interferometer 80 shown in FIG. 14 is used to measure the phase modulation amounts Φ. More specifically, the control input values A the same for all pixels are converted to a DA input values B using the LUTs 11, the DA input values B are converted to analog signals C, and the analog signals C are applied to the LCoS spatial light modulator 2. In S133 a pixel that has attained the maximum phase modulation amount and a pixel that has attained the minimum phase modulation amount are found. In S134 the range between the minimum and maximum values of the phase modulation amounts is divided into r segments at even intervals, and pixels having phase modulation amounts within the same segment are combined in the same group. The relationship between the groups configured above and their pixels is saved in the LUT map 15.

In this method, the Michelson interferometer 80 is used to measure the phase modulation amounts Φ after converting the control input values A to DA input values B with LUTs 11 for each pixel, thereby correcting the voltage-dependent phase modulation characteristics. Hence, this method corrects the phase modulation amount φ that depends on voltage V as shown in equation (1), removing irregularities among pixels. Therefore, irregularities in the measured phase modulation amount Φ for each pixel mean the irregularity of $\Phi_0$ for each pixel, where $\Phi_0$ is a quantity indicating distortion in the silicon substrate. Hence, all pixels in the LUT map 15 created according to this method have been grouped according to the voltage-independent phase modulation characteristics indicating distortion in the silicon substrate.

2. In this variation, the method of creating the LUT map 15 described in FIG. 28 is modified as follows. According to the second embodiment, in S111 of FIG. 28, the polarization interferometer 60 in FIG. 9 is used to measure phase modulation amounts while applying the same voltage to all the pixels in the LCoS spatial light modulator 2 based on the same DA input value B. These measurements are repeated while varying the DA input value B from 0 to 4,095. In this variation, the Michelson interferometer 80 shown in FIG. 14 is used in place of the polarization interferometer 60. Further, the Michelson interferometer 80 measures phase modulation amounts while applying the same voltage to all the pixels in the LCoS spatial light modulator 2 based on the same DA input value B. This measurement is performed while applying a voltage value corresponding to only a single DA input value B falling between 0 and 4,095, and the processes in S112-S115 are not executed. In S116 minimum and maximum values are found from the phase modulation amounts acquired in S111 for all pixels, and a range of maximum and minimum values of the phase modulation amounts is divided into r segments. Pixels corresponding to phase modulation amounts belonging to the same segment are combined into a single group. The LUT map 15 is then created by finding the relationships between these pixels and their groups.

In this method, the Michelson interferometer 80 is used to measure the phase modulation amounts Φ, without using the LUTs 11 for each pixel. Hence, the measured phase modulation amounts Φ include the quantity φ dependent on voltage in equation (1). As indicated in equation (2), φ is dependent on the thickness d(x, y) of the liquid crystal layer 27. For a LCoS spatial light modulator 2 having no distortion in the glass substrate 25, the thickness d(x, y) of the liquid crystal layer 27 is a quantity indicating distortion in the reflecting surface. Hence, finding Φ in equation (1) is equivalent to finding a quantity related to distortion in the silicon substrate 21. Therefore, this method groups pixels based on their voltage-independent phase modulation characteristics indicating distortion in the silicon substrate 21.

3. Similarly to the method 2 above, in S111 the Michelson interferometer 80 of FIG. 14 is used to measure the phase modulation amount Φ achieved by each pixel. A pattern is created based on the results of these measurements for achieving uniform values of the phase modulation amount Φ in all pixels, and the LUT map 15 is created using this pattern. Specifically, the DA input value B is sequentially set to all values from 0 to 4,095. Every time the DA input values B is set to one of the values of 0-4095, each pixel is driven with the corresponding analog signal C. A pattern showing the distribution of DA input values B is found based on the acquired phase modulation amounts. This pattern is a distribution of DA input values B that have caused the pixels to attain the same amounts of phase modulation. The processes in S112-S115 are not executed in this method. In S116 minimum and maximum values are found for the DA input values B distributed in the pattern found in S111, and a range between minimum and maximum values of the DA input values B is divided into r segments, and pixels attaining phase modulation amounts within the same segment are combined in the same group. The LUT map 15 is then created by finding the relationship between the pixels and their groups. This method can group the pixels according to their voltage-independent phase modulation characteristics indicating distortion in the silicon substrate 21.

In the above methods 1-3, the voltage independent distortion is measured by the Michelson interferometer 80 and the pixels are grouped based on the liquid crystal layer thickness d(x, y) of the liquid crystal layer 27. However, the measuring method is not limited to the above methods. It is possible to group the pixels by measuring quantities that show differences of the liquid crystal layer thickness d(x, y). Thus, based on the measured quantities, the LUT map is created as the same method of the above method 1-3. For example, the liquid crystal layer thickness d(x, y) for each pixel position may be optically measured.

Methods 1-3 can group pixels in a manner that reflects quantities indicating distortion in the silicon substrate 21.

Thirteenth Variation of the Second Embodiment

Figure 33B:
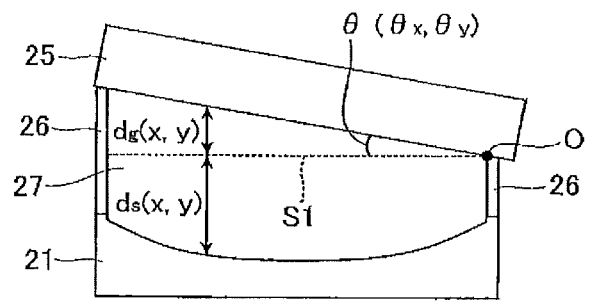
FIG. 33(B) is an explanatory diagram illustrating the thickness of the liquid crystal layer and tilt in the glass substrate of the LCoS spatial light modulator.

If, as illustrated in FIG. 33(B), the glass substrate 25 is tilted in any of the three methods in the twelfth variation described above, it is preferable to perform correction considering tilt of the glass substrate. If the glass substrate 25 is not tilted, the distortion of the silicon substrate 21 shows the differences in thickness of the liquid crystal layer 27, that is, the distortion of the silicon substrate 27 shows the differences of the phase modulation amounts among the pixels. Thus, pixels are grouped based on the distortion of the silicon substrate 21. However, if the glass substrate 25 is tilted, distortion in the silicon substrate 21 does not mean differences in thickness of the liquid crystal layer, as illustrated in FIG. 33(B). Thus, the tilt of the glass substrate 25 needs to be considered when grouping pixels.

When the glass substrate 25 is tilted, pixels are divided into groups considering not only the distortion of the silicon substrate 21 that relates to a part of liquid crystal layer thickness ($d_s(x, y)$) but also irregularities of a part of liquid crystal layer thickness ($d_g(x, y)$) that is caused by the tilt of the glass substrate 25. It is noted that $\theta_x$ and $\theta_y$ represent tilt angles in the bottom surface of the glass substrate 25 relative to the x and y directions, respectively. In FIG. 33(B), a reference plane 51 is a plane parallel to the bottom surface of the silicon substrate 21. When the glass substrate 25 is not tilted, the bottom surface of the glass substrate 25 matches the reference imaginary plane 51. A part of the liquid crystal layer thickness from the top surface of the silicon substrate 21 to the reference plane S1 is represented by $d_s(x, y)$, while a part of the liquid crystal layer thickness from the reference plane S1 to the glass substrate 25 is represented by $d_g(x, y)$. The total of the liquid crystal layer thickness $d(x, y)$ is given by adding $d_s(x, y)$ to $d_g(x, y)$.

It is possible to calculate the voltage-dependent phase modulation amount ($\phi_g(V, x, y)$) attributed to the part of liquid crystal layer thickness $d_g(x, y)$ when the tilt angles $\theta_x$ and $\theta_y$ are known. So, $d_g(x, y)$ is obtained by calculating following equation (21).

$$d_g(x,y) = L_x \tan \theta_x + L_y \tan \theta_y \quad (21)$$

Here, a reference point O is the point where $d_g(x, y)=0$. $L_x$ and $L_y$ are distances in the x and y directions, respectively, from the reference point O to the pixel position $(x, y)$.

The voltage-dependent phase modulation amount $\phi_g(V, x, y)$ is calculated from the following equation.

$$\phi_g(V,x,y) = 2\Delta n(V) d_g(x,y) \quad (22)$$

So in this variation, the phase modulation amounts $\Phi_0(x, y)$ is measured as quantities that specify the distortion of the silicon substrate 21. To obtain the LUT map 15, at first, the LUTs 11 are created for all pixels similar to the processes in S121-S127 shown in FIG. 29. Next, by using the Michelson interferometer 80 in FIG. 14, the phase modulation amounts $\Phi(V, x, y)$ are measured by applying drive voltages after converting the control input values A to DA input values B with the LUTs 11 for each pixel. Here, the drive voltage applied to each pixel $(x, y)$ is indicated as V in equation (22). Since the LUTs 11 is used before measurement, irregularities in the voltage-dependent phase modulation amounts $\Phi_0(V, x, y)$ are canceled. Thus, irregularities in the measured phase modulation amounts ($\Phi(V, x, y)$) depend only on the irregularities in the voltage independent phase modulation amounts $\Phi_0(x, y)$. It is noted that the measured quantity $\Phi(V, x, y)$ does not relate $\Phi_g(V, x, y)$.

In other words, the measured phase modulation amounts $\Phi(V, x, y) (=\Phi_0(x, y))$ show distribution in the part of liquid crystal layer thickness $d_s(x, y)$. On the other hands, $\phi_g(V, x, y)$ is given by calculations indicative of distribution in the part of liquid crystal layer thickness $d_g(x, y)$. Hence, the phase modulation amounts accounting for tilt are found by adding phase modulation amounts $\Phi_0(x, y)$ measured by the Michelson interferometer 80 to $\phi_g(V, x, y)$ found from equation (22), and performing fold back process for the phase to the sums. Pixels are grouped based on the fold backed phase modulation amounts (hereinafter, phase modulation amount accounting for tilt) similarly to the twelfth variation described above. For example, when grouping pixels in a similar manner to the twelfth variation, at first, minimum and maximum values of phase modulation amounts accounting for tilt are identified. A range between the minimum and maximum values of the phase modulation amounts accounting for tilt are divided into r segments at even intervals. Pixels having phase modulation amounts accounting for tilt in the same segment are grouped together, and the LUT map 15 is created based on these groups.

Pixels are thus grouped in a manner that reflects quantities indicating distortion in the silicon substrate 21 and the tilt of the glass substrate 25.

While the invention has been described in detail with reference to the above embodiments thereof, it would be apparent to those skilled in the art that various changes and modifications may be made therein without departing from the spirit of the invention.

Other phase-modulating spatial light modulators may be used in place of the LCoS spatial light modulator 2, such as an optically addressable phase modulator, a MEMS phase modulator, deformable mirrors, and an analog magneto-optic device. One possible optically addressable phase modulator is described in "High Efficiency Electrically-Addressable Phase-Only Spatial Light Modulator", Yasunori Igasaki et al., Optical Review, Vol. 6, No. 4, pp. 339-344, 1999. One possible MEMS phase modulator is described in "One Megapixel SLM with high optical fill factor and low creep actuators", M. Friedrichs et al., Optical MEMS and Their Applications Conference 2006, IEEE/LEOS International Conference on. One analogue magneto-optic device is described in "Magnetophotinic crystals—a novel magneto-optic material with artificial periodic structures", Mitsuteru Inoue et al., J. Mater. Chem. Vol. 16, pp 678-684, 2006.

When using a MEMS SLM, voltage-independent distortion appears as wavefront distortion acquired when no voltage is applied. If V=0 in equation (1), then $\phi(V, x, y)=0$ and $\phi_0=\Phi(0, x, y)$. Hence, the $\Phi_0$ attributed to distortion in the reflecting surface can be found through measurements with the Michelson interferometer 80 in FIG. 14, without applying a voltage. The calibration pattern 12 is created based on $\Phi_0$. Further, the voltage-dependent phase modulation characteristics appear as irregularities in phase modulation amounts among pixels when a voltage is applied. These voltage-dependent phase modulation characteristics can be corrected with the LUTs 51 created according to the method in the second embodiment.

The analog magneto-optic device rotates the polarizing direction of incident light when voltage is applied. The voltage-independent phase modulation characteristics indicate irregularities among pixels in the rotation of the polarizing direction for light measured by the Michelson interferometer 80 in FIG. 14 without the application of voltage. The voltage-dependent phase modulation characteristics indicate irregularities among pixels in the rotation amount of the polarizing direction for light measured with the Michelson interferometer 80 when voltage is applied. Hence, the calibration pattern 12 is created based on the rotation of the polarizing direction measured by the Michelson interferometer 80 without applying voltage, while the LUTs 11 or 51 can be created based on the amount of rotation in the polarizing direction measured by the Michelson interferometer 80 when voltage is applied.

In the first and second embodiments the drive section 321 is set such that the DA input values B (0-4094) are assigned linearly to the working voltage range Q-R based on the voltage-dependent phase modulation characteristics. However, the drive unit 321 may remain in initial setting. That is, the drive unit 321 is set such that the DA input values B (0-4096) are assigned linearly to the operating voltage P-S.

The phase-modulating apparatuses of the above-described embodiments and variations are suitable for use in laser machining, optical tweezers, adaptive optics, imaging optical systems, optical communications, aspheric lens inspection, pulse shape control for short-pulse lasers, optical memory devices, and the like.

What is claimed is:

1. An apparatus for modulating light, comprising:
   a spatial light modulator including a plurality of blocks, each of the blocks including a plurality of pixels, the spatial light modulator being configured to modulate input light in response to a drive voltage for each of the pixels;
   an input value setting unit configured to set an input value for the each of the pixels;
   a converting unit configured to convert the input value to a control value based on a plurality of different look-up tables, each of the look-up tables corresponding to a respective block of the plurality of blocks; and
   a driving unit configured to drive each of the pixels in response to the drive voltage corresponding to the control value, wherein
   each of the look-up tables is configured to store values for the corresponding block based on a phase modulation amount measured for each of the pixels,
   when the phase modulation amount is measured for only one pixel in the block, the stored values are based on the phase modulation amount of the one pixel of the plurality of pixels in the block, and
   when the phase modulation amount is measured for more than one pixel in the block, the stored values are based on an average of the phase modulation amount for each of the plurality of pixels in the block.

2. The apparatus according to claim 1, wherein the driving unit converts the control value to a voltage value and drives the each of the pixels in response to the drive voltage.

3. The apparatus according to claim 1, wherein the look-up tables are set based on voltage-dependent phase modulation characteristics of each of the pixels.

4. The apparatus according to claim 1, wherein the look-up tables are created by measuring light that is modulated by the spatial light modulator.

5. A method for modulating light using a spatial light modulator including a plurality of blocks, each of the blocks including a plurality of pixels, the method comprising:
   setting an input value for the each of the pixels;
   converting the input value to a control value based on a plurality of different look-up tables, each of the look-up tables corresponding to a respective block of the plurality of blocks; and
   driving the each of the pixels in response to the drive voltage corresponding to the control value to modulate input light, wherein
   each of the look-up tables is configured to store values for the corresponding block based on a phase modulation amount measured for each of the pixels,
   when the phase modulation amount is measured for only one pixel in the block, the stored values are based on the phase modulation amount of the one pixel of the plurality of pixels in the block, and
   when the phase modulation amount is measured for more than one pixel in the block, the stored values are based on an average of the phase modulation amount for each of the plurality of pixels in the block.

6. The method according to claim 5, wherein the driving unit converts the control value to a voltage value and drives the each of the pixels in response to the drive voltage.

7. The method according to claim 5, wherein the look-up tables are set based on the voltage-dependent phase modulation characteristics of each of the pixels.

8. The method according to claim 5, further comprising:
   creating the look-up tables by measuring light that is modulated by the spatial light modulator.

* * * * *